United States Patent
Hattori et al.

(10) Patent No.: US 8,642,142 B2
(45) Date of Patent: *Feb. 4, 2014

(54) LIQUID CRYSTAL COMPOSITION AND LIQUID CRYSTAL DISPLAY DEVICE

(75) Inventors: Norikatsu Hattori, Chiba (JP); Shogo Yoshida, Chiba (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/577,658

(22) PCT Filed: Feb. 1, 2011

(86) PCT No.: PCT/JP2011/052033
§ 371 (c)(1),
(2), (4) Date: Aug. 8, 2012

(87) PCT Pub. No.: WO2011/099400
PCT Pub. Date: Aug. 18, 2011

(65) Prior Publication Data
US 2012/0298917 A1 Nov. 29, 2012

(30) Foreign Application Priority Data
Feb. 12, 2010 (JP) .................. 2010-028636

(51) Int. Cl.
*C09K 19/30* (2006.01)
*C09K 19/52* (2006.01)
*C09K 19/12* (2006.01)
*C09K 19/20* (2006.01)
*C09K 19/34* (2006.01)

(52) U.S. Cl.
USPC .................. 428/1.1; 252/299.01; 252/299.61; 252/299.63; 252/299.66; 252/299.67

(58) Field of Classification Search
USPC ............. 252/299.01, 299.61, 299.63, 299.66, 252/299.67; 428/1.1
See application file for complete search history.

(56) References Cited

U.S. PATENT DOCUMENTS

| | | | |
|---|---|---|---|
| 6,315,922 B1 * | 11/2001 | Takeshita et al. | 252/299.61 |
| 6,497,929 B1 * | 12/2002 | Miyairi et al. | 428/1.1 |
| 7,709,066 B2 * | 5/2010 | Matsumura et al. | 428/1.1 |
| 7,842,358 B2 * | 11/2010 | Czanta et al. | 428/1.1 |
| 8,012,369 B2 * | 9/2011 | Saito et al. | 252/299.6 |
| 8,366,964 B2 * | 2/2013 | Maeda et al. | 252/299.63 |
| 8,367,167 B2 * | 2/2013 | Yanai et al. | 428/1.1 |

FOREIGN PATENT DOCUMENTS

| | | |
|---|---|---|
| JP | 2001-123170 | 5/2001 |
| JP | 2009-084560 | 4/2009 |
| JP | 2009-215556 | 9/2009 |
| WO | 2008/102641 | 8/2008 |

* cited by examiner

*Primary Examiner* — Shean C Wu
(74) *Attorney, Agent, or Firm* — Jiang Chyum IP Office

(57) ABSTRACT

Provided is an AM device containing a liquid crystal composition satisfying at least one of characteristics such as a high maximum temperature of a nematic phase, a low minimum temperature of the nematic phase, a small viscosity, a large optical anisotropy, a large positive dielectric anisotropy, a large specific resistance, a high stability to ultraviolet light and a high stability to and heat, or having a suitable balance regarding at least two of the characteristics, and the AM device having a short response time, a large voltage holding ratio, a large contrast ratio, a long service life and so forth; wherein a liquid crystal display device contains a liquid crystal composition having a positive dielectric anisotropy and containing a specific compound having a large positive dielectric anisotropy as a first component and a specific compound having a small viscosity as a second component.

19 Claims, No Drawings

LIQUID CRYSTAL COMPOSITION AND LIQUID CRYSTAL DISPLAY DEVICE

CROSS-REFERENCE TO RELATED APPLICATION

This application is a 371 of international application of PCT application serial no. PCT/JP2011/052033, filed on Feb. 1, 2011, which claims the priority benefit of Japan application no. 2010-028636, filed on Feb. 12, 2010. The entirety of each of the above-mentioned patent applications is hereby incorporated by reference herein and made a part of this specification.

TECHNICAL FIELD

The invention relates mainly to a liquid crystal composition suitable for use in an AM (active matrix) device and so forth, and an AM device and so forth that contain the composition. More specifically, the invention relates to a liquid crystal composition having positive dielectric anisotropy, and a device containing the composition and having a mode such as a TN (twisted nematic) mode, an OCB (optically compensated bend) mode, an IPS (in-plane switching) mode, a fringe field switching (FFS) mode or a PSA (polymer sustained alignment) mode.

BACKGROUND ART

In a liquid crystal display device, a classification based on an operating mode for liquid crystals includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a polymer sustained alignment (PSA) mode. A classification based on a driving mode in a device includes a passive matrix (PM) and an active matrix (AM). The PM is further classified into static, multiplex and so forth, and the AM is classified into a thin film transistor (TFT), a metal insulator metal (MIM) and so forth. The TFT is further classified into amorphous silicon TFT and polycrystal silicon TFT. The latter is classified into a high temperature type and a low temperature type according to a production process. A classification based on a light source includes a reflective type utilizing natural light, a transmissive type utilizing backlight and a transflective type utilizing both the natural light and the backlight.

The devices contain a liquid crystal composition having suitable characteristics. The liquid crystal composition has a nematic phase. General characteristics of the composition should be improved to obtain an AM device having good general characteristics. Table 1 below summarizes a relationship of the general characteristics between two aspects. The general characteristics of the composition will be explained further based on a commercially available AM device. A temperature range of the nematic phase relates to a temperature range in which the device can be used. A preferred maximum temperature of the nematic phase is about 70° C. or higher and a preferred minimum temperature of the nematic phase is about −10° C. or lower. Viscosity of the composition relates to response time in the device. A short response time is preferred for displaying moving images on the device. Accordingly, a small viscosity in the composition is preferred. A small viscosity at a low temperature is further preferred. An elastic constant of the composition relates to contrast in the device. In order to increase the contrast in the device, a larger elastic constant in the composition is further preferred.

TABLE 1

General Characteristics of Composition and AM Device

| No. | General Characteristics of Composition | General Characteristics of AM Device |
|---|---|---|
| 1 | wide temperature range of a nematic phase | wide usable temperature range |
| 2 | small viscosity[1] | short response time |
| 3 | suitable optical anisotropy | large contrast ratio |
| 4 | large positive or negative dielectric anisotropy | low threshold voltage and small electric power consumption large contrast ratio |
| 5 | large specific resistance | large voltage holding ratio and large contrast ratio |
| 6 | high stability to ultraviolet light and heat | long service life |
| 7 | large elastic constant | large contrast ratio and short response time |

[1] A liquid crystal composition can be injected into a liquid crystal cell in a shorter period of time.

An optical anisotropy of the composition relates to a contrast ratio in the device. A product ($\Delta n \times d$) of the optical anisotropy ($\Delta n$) of the composition and a cell gap (d) in the device is designed so as to maximize the contrast ratio. A suitable value of the product depends on a type of the operating mode. The suitable value is about 0.45 micrometer in a device having the mode such as TN. In the above case, a composition having a large optical anisotropy is preferred for a device having a small cell gap. A large dielectric anisotropy in the composition contributes to a low threshold voltage, a small electric power consumption and a large contrast ratio in the device. Accordingly, the large dielectric anisotropy is preferred. A large specific resistance in the composition contributes to a large voltage holding ratio and a large contrast ratio in the device. Accordingly, a composition having a large specific resistance at room temperature and also at a temperature close to a maximum temperature of the nematic phase in an initial stage is preferred. A composition having a large specific resistance at room temperature and also at a temperature close to the maximum temperature of the nematic phase after the device has been used for a long period of time is preferred. Stability of the composition to ultraviolet light and heat relates to a service life of the liquid crystal display device. In the case where the stability thereto is high, the device has a long service life. Such characteristics are preferred for an AM device used in a liquid crystal projector, a liquid crystal television and so forth. A large elastic constant in the composition contributes to a large contrast ratio and a short response time in the device. Accordingly, the large elastic constant is preferred.

A composition having a positive dielectric anisotropy is used for an AM device having the TN mode. On the other hand, a composition having a negative dielectric anisotropy is used for an AM device having the VA mode. A composition having a positive or negative dielectric anisotropy is used for an AM device having the IPS mode or the FFS mode. A composition having a positive or negative dielectric anisotropy is used for an AM device having the PSA mode. Examples of the liquid crystal compositions having the positive dielectric anisotropy are disclosed in the following Patent literatures.

PRIOR ART

Patent Document

Patent Document No. 1: JP 2009-84560 A.
Patent Document No. 2: WO 2008-102641 A.

A desirable AM device has characteristics such as a wide temperature range in which a device can be used, a short response time, a large contrast ratio, a low threshold voltage, a large voltage holding ratio and a long service life. A shorter response time even by one millisecond is desirable. Thus, desirable characteristics of a composition include a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant.

SUMMARY OF INVENTION

Technical Problem

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant. Another aim is to provide a liquid crystal composition having a suitable balance regarding at least two of the characteristics. A further aim is to provide a liquid crystal display device containing such a composition. An additional aim is to provide a composition having a suitable optical anisotropy, a large dielectric anisotropy, a high stability to ultraviolet light, a large elastic constant and so forth, and is to provide an AM device having a short response time, a large voltage holding ratio, a large contrast ratio, a long service life and so forth.

Solution to Problem

The invention concerns a liquid crystal composition containing the composition that includes at least one compound selected from the group of compounds represented by formula (1) as a first component, and at least one compound selected from the group of compounds represented by formula (2) as a second component:

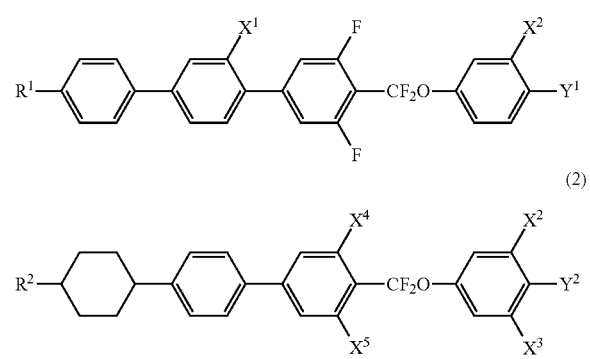

wherein $R^1$ and $R^2$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; $X^1$, $X^2$, $X^3$, $X^4$ and $X^5$ are independently hydrogen or fluorine; $Y^1$ is fluorine or chlorine; $Y^2$ is fluorine, chlorine or trifluoromethoxy.

Advantageous Effects of Invention

An advantage of the invention is a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant. One aspect of the invention is a liquid crystal composition having a suitable balance regarding at least two of the characteristics. Another aspect is a liquid crystal display device containing such a composition. A further aspect is a composition having a suitable optical anisotropy, a large positive dielectric anisotropy, a high stability to ultraviolet light, a large elastic constant and so forth, and is an AM device having a short response time, a large voltage holding ratio, a large contrast ratio, a long service life and so forth.

DESCRIPTION OF EMBODIMENTS

Usage of terms in the specification and claims is as described below. A liquid crystal composition or a liquid crystal display device of the invention may be abbreviated as "composition" or "device," respectively. The liquid crystal display device is a generic term for a liquid crystal display panel and a liquid crystal display module. "Liquid crystal compound" means a compound having a liquid crystal phase such as a nematic phase or a smectic phase, or a compound having no liquid crystal phase but being useful as a component of the composition. Such a useful compound has a six-membered ring such as 1,4-cyclohexylene and 1,4-phenylene, and a rod-like molecular structure. An optically active compound or a polymerizable compound may occasionally be added to the composition. Even in the case where the compounds are liquid crystalline, the compounds are classified as an additive herein. At least one compound selected from the group of compounds represented by formula (1) may be abbreviated as "compound (1)." "Compound (1)" means one compound or two or more compounds represented by formula (1). A same rule applies to any other compound represented by any other formula. "Arbitrary" means any of not only positions but also numbers without including the case where the number is 0 (zero).

A higher limit of a temperature range of the nematic phase may be abbreviated as "maximum temperature." A lower limit of the temperature range of the nematic phase may be abbreviated as "minimum temperature." An expression "a specific resistance is large" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. An expression "a voltage holding ratio is large" means that the device has a large voltage holding ratio at room temperature and also at a temperature close to the maximum temperature of the nematic phase in an initial stage, and that the device has a large voltage holding ratio at room temperature and also at a temperature close to the maximum temperature of the nematic phase even after the device has been used for a long period of time. When characteristics such as an optical anisotropy are explained, values obtained according to the measuring methods described in Examples will be used. A first component includes one compound or two or more compounds. "Ratio of the first component" is expressed in terms of weight percent (% by weight) of the first component based on the total weight of the liquid crystal composition. A ratio of a second component and so forth are expressed in a similar manner. A ratio of the additive mixed with the composition is expressed in terms of weight percent (% by weight) or weight parts per million (ppm) based on the total weight of the liquid crystal composition.

A symbol $R^1$ is used for a plurality of compounds in the chemical formulas of component compounds. In the compounds, meanings of two of arbitrary $R^1$ may be identical or different. In one case, for example, $R^1$ of compound (1) is ethyl and $R^1$ of compound (1-1) is ethyl. In another case, $R^1$ of compound (1) is ethyl and $R^1$ of compound (1-1) is propyl. The same rule applies to a symbol $X^1$, $Y^1$ or the like.

The invention includes the items described below.

Item 1. The liquid crystal composition contains at least one compound selected from the group of compounds represented by formula (1) as a first component, and at least one compound selected from the group of compounds represented by formula (2) as a second component:

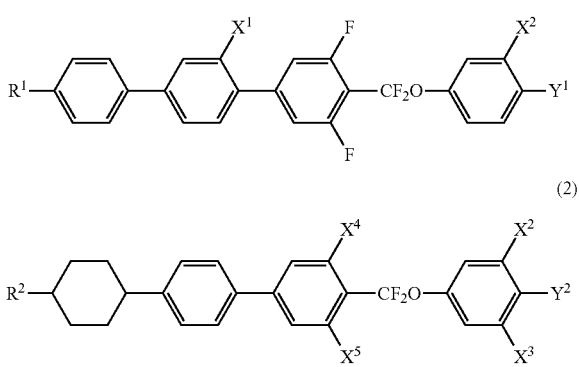

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $X^1$, $X^2$, $X^3$, $X^4$ and $X^5$ are independently hydrogen or fluorine; $Y^1$ is fluorine or chlorine; $Y^2$ is fluorine, chlorine or trifluoromethoxy.

Item 2. The liquid crystal composition according to item 1, wherein the first component is at least one compound selected from the group of compounds represented by formula (1-1) or formula (1-2).

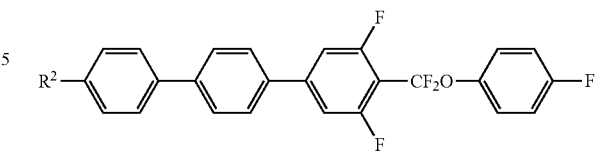

wherein $R^1$ is alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

Item 3. The liquid crystal composition according to item 2, wherein the first component is at least one compound selected from the group of compounds represented by formula (1-1).

Item 4. The liquid crystal composition according to any one of items 1 to 3, wherein the second component is at least one compound selected from the group of compounds represented by formula (2-1) to formula (2-2):

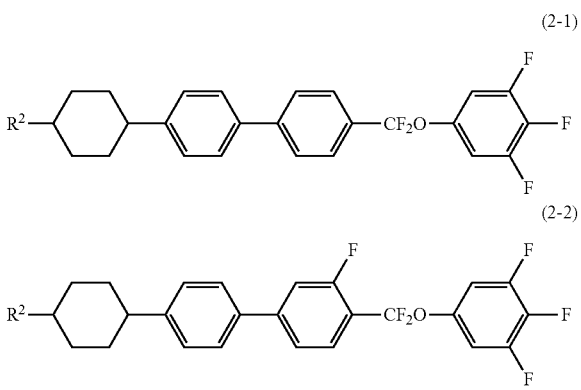

wherein $R^2$ is alkyl having 1 to 12 carbons, alkoxy having 1 to 12 carbons, alkenyl having 2 to 12 carbons, or alkenyl having 2 to 12 carbons in which arbitrary hydrogen is replaced by fluorine.

Item 5. The liquid crystal composition according to item 4, wherein the second component is at least one compound selected from the group of compounds represented by formula (2-1).

Item 6. The liquid crystal composition according to any one of items 1 to 5, wherein a ratio of the first component is in the range of 10% by weight to 50% by weight and a ratio of the second component thereof is in the range of 10% by weight to 90% by weight based on the total weight of the liquid crystal composition.

Item 7. The liquid crystal composition according to any one of items 1 to 6, wherein the liquid crystal composition further contains at least one compound selected from the group of compounds represented by formula (3) as a third component:

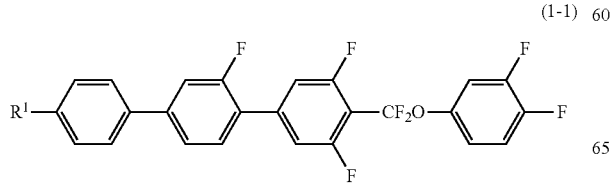

wherein $R^3$ and $R^4$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring A and ring B are independently 1,4-cyclohexylene, 1,4-phenylene, 2-fluoro-1,4-phenylene, or 3-fluoro-1,4-phenylene; $Z^1$ is independently a single bond, ethylene or carbonyloxy; and p is 1, 2 or 3.

Item 8. The liquid crystal composition according to item 7, wherein the third component is at least one compound selected from the group of compounds represented by formula (3-1) to formula (3-16):

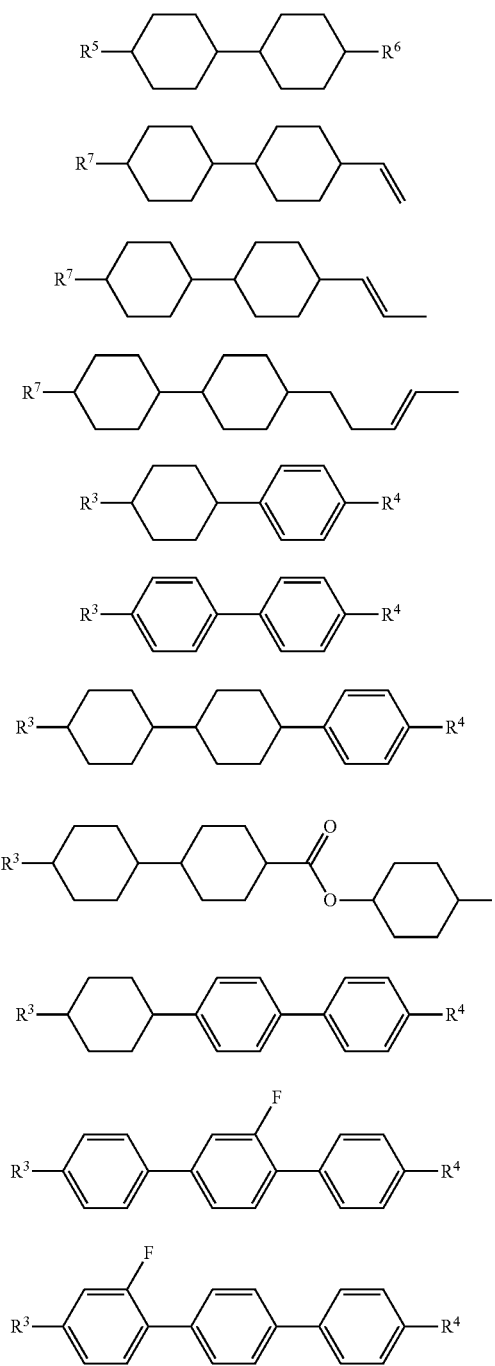
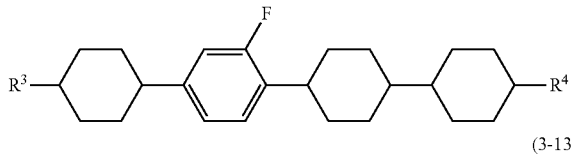
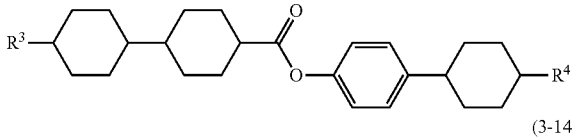
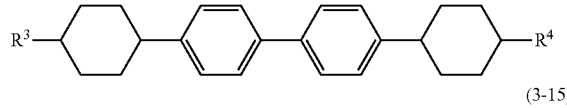
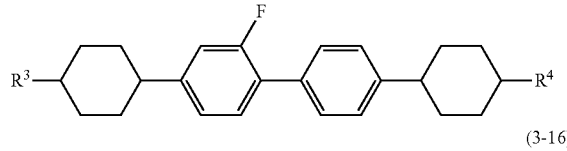
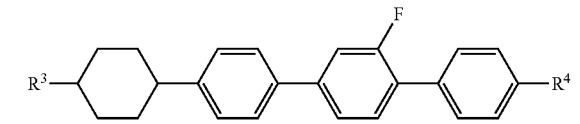

wherein $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; $R^5$ and $R^6$ are independently alkyl having 1 to 12 carbons or alkoxy having 1 to 12 carbons; $R^7$ is alkyl having 1 to 12 carbons.

Item 9. The liquid crystal composition according to item 8, wherein the third component is at least one compound selected from the group of compounds represented by formula (3-2).

Item 10. The liquid crystal composition according to item 8, wherein the third component is at least one compound selected from the group of compounds represented by formula (3-4).

Item 11. The liquid crystal composition according to item 8, wherein the third component is at least one compound selected from the group of compounds represented by formula (3-10).

Item 12. The liquid crystal composition according to item 8, wherein the third component is a mixture at least one compound selected from the group of compounds represented by formula (3-2) and at least one compound selected from the group of compounds represented by formula (3-10).

Item 13. The liquid crystal composition according to any one of items 7 to 12, wherein a ratio of the third component is in the range of 5% by weight to 80% by weight based on the total weight of the liquid crystal composition.

Item 14. The liquid crystal composition according to any one of items 1 to 13, wherein the liquid crystal composition further contains at least one compound selected from the group of compounds represented by formula (4) as a fourth component:

$$\text{(4)} \quad R^8 - \left( \boxed{C} - Z^2 \right)_q - \text{Ar}(X^6, Y^3, X^7)$$

wherein $R^8$ is alkyl having 1 to 12 carbons, alkoxy having 1 to 12 carbons or alkenyl having 2 to 12 carbons; ring C is independently 1,4-cyclohexylene, 1,4-phenylene, 1,3-fluoro-1,4-phenylene, 3,5-difluoro-1,4-phenylene, 2,5-pyrimidine, 1,3-dioxane-2,5-diyl or tetrahydropyran-2,5-diyl; $X^6$ and $X^7$ are independently hydrogen or fluorine; and $Y^3$ is fluorine, chlorine or trifluoromethoxy; $Z^2$ is independently a single bond, ethylene, carbonyloxy or difluoromethyleneoxyl; q is 1, 2 or 3; and three $Z^2$ are all single bonds when q is 3.

Item 15. The liquid crystal composition according to item 14, wherein the fourth component is at least one compound selected from the group of compounds represented by formula (4-1) to formula (4-21):

(4-17)
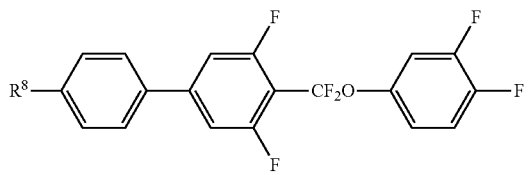

(4-18)
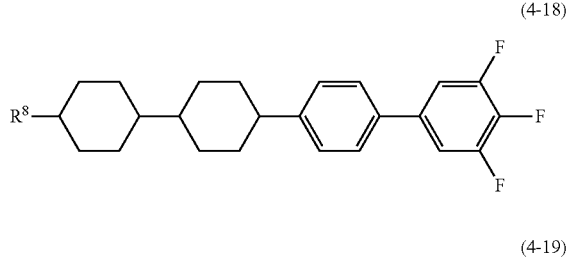

(4-19)

(4-20)
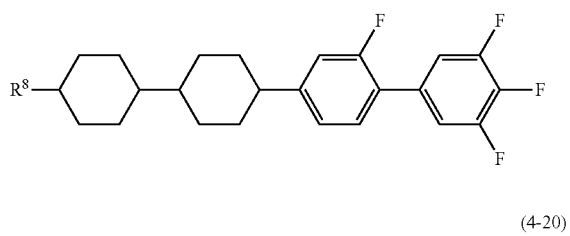

(4-21)
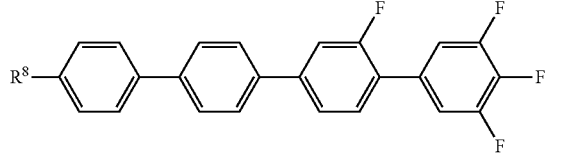

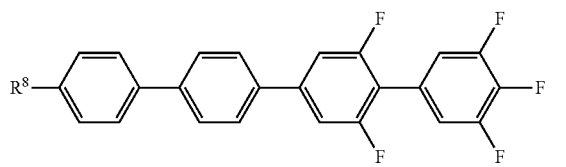

wherein R⁸ is alkyl having 1 to 12 carbons, alkoxy having 1 to 12 carbons or alkenyl having 2 to 12 carbons.

Item 16. The liquid crystal composition according to item 15, wherein the fourth component is at least one compound selected from the group of compounds represented by formula (4-14).

Item 17. The liquid crystal composition according to item 15, wherein the fourth component is at least one compound selected from the group of compounds represented by formula (4-15).

Item 18. The liquid crystal composition according to any one of items 14 to 17, wherein a ratio of the fourth component is in the range of 5% by weight to 40% by weight based on the total weight of the liquid crystal composition.

Item 19. The liquid crystal composition according to any one of items 1 to 18, wherein the fifth component is at least one compound selected from the group of compounds represented by formula (5).

(5)
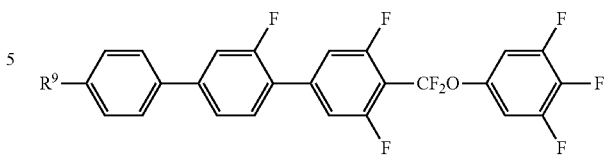

wherein $R^9$ is alkyl having 1 to 12 carbons, alkoxy having 1 to 12 carbons or alkenyl having 2 to 12 carbons.

Item 20. The liquid crystal composition according to item 19, wherein a ratio of the fifth component is in the range of 5% by weight to 40% by weight based on the total weight of the liquid crystal composition.

Item 21. The liquid crystal composition according to any one of items 1 to 20, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is 2 or more.

Item 22. The liquid crystal display device according to any one of items 1 to 21 including the liquid crystal composition.

Item 23. The liquid crystal display device according to claim 22, wherein the operating mode of the liquid crystal display device is a TN mode, an OCB mode, an IPS mode, FFS mode or PSA mode, and the driving mode of the liquid crystal display device is an active matrix mode.

The invention further includes the following items: (1) the composition further containing the optically active compound; (2) the composition further containing the additive such as an antioxidant, an ultraviolet light absorber, an anti-foaming agent, the polymerizable compound and a polymerization initiator; (3) an AM device containing the composition; (4) a device containing the composition, and having TN mode, an ECB mode, an OCB mode, an IPS mode or PSA mode; (5) a transmissive device containing the composition; (6) use of the composition as the composition having the nematic phase; and (7) use as an optically active composition prepared by adding the optically active compound to the composition.

The composition of the invention will be explained in the following order. First, a constitution of the component compounds in the composition will be explained. Second, main characteristics of the component compounds and main effects of the compounds on the composition will be explained. Third, a combination of components in the composition, a preferred ratio of the components and the basis thereof will be explained. Fourth, a preferred embodiment of the component compounds will be explained. Fifth, specific examples of the component compounds will be shown. Sixth, the additive that may be mixed with the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain the compounds selected by the compounds (1), (2), (3), (4), (5) and any other liquid crystal compounds, the additive and an impurity "Any other liquid crystal compound" means a liquid crystal compound different from compound (1), compound (2), compound (3), compound (4) and compound (5). Such a compound is mixed with the composition for the purpose of further adjusting the characteristics. The additive includes the optically active compound, the antioxidant, the ultraviolet light absorber, a dye, the antifoaming agent, the polymerizable compound and the polymerization initiator. The impurity includes a compound mixed in a process for preparation of the component compounds, or the like. Even in the case where the compound is liquid crystalline, the compound is classified as the impurity herein.

Composition B consists essentially of compounds selected from compound (1), compound (2), compound (3), compound (4) and compound (5). A term "essentially" means that the composition may contain the additive and the impurity but does not contain any liquid crystal compound different from the compounds. Composition B has a smaller number of components than composition A has. Composition B is preferable to composition A from a viewpoint of cost reduction. Composition A is preferable to composition B from a viewpoint that physical properties can be further adjusted by mixing the other liquid crystal compound.

Second, the main characteristics of the component compounds and the main effects of the compounds on the characteristics of the composition will be explained. Table 2 summarizes the main characteristics of the component compounds on the basis of effects of the invention. In Table 2, a symbol L means "large" or "high," a symbol M means "medium," and a symbol S means "small" or "low." The symbols L, M and S represent a classification based on a qualitative comparison among the component compounds. 0 (zero) means that the value is close to zero.

TABLE 2

Physical Properties of Compounds

| Compounds | Compound (1) | Compound (2) | Compound (3) | Compound (4) | Compound (5) |
|---|---|---|---|---|---|
| Maximum Temperature | L | L | S to L | M to L | M |
| Viscosity | M | M | S to M | M to L | L |
| Optical Anisotropy | L | M | S to L | M to L | L |
| Dielectric Anisotropy | L | L | 0 | M to L | L |
| Specific Resistance | L | L | L | L | L |

Upon mixing the component compounds with the composition, the main effects of the component compounds on the characteristics of the composition are as follows. Compound (1) increases the maximum temperature, optical anisotropy, and the dielectric anisotropy. Compound (2) increases the maximum temperature and the dielectric anisotropy. Compound (3) decrease the minimum temperature and the viscosity. Compound (4) decreases the optical anisotropy and increases the dielectric anisotropy. Compound (5) increases the optical anisotropy and the dielectric anisotropy.

Third, the combination of the components in the composition, the preferable ratio of the components and the basis thereof will be explained. The combination of the components in the composition includes a combination of the first component and the second component, a combination of the first component, the second component and the third component, a combination of the first component, the second component and the fourth component, and a combination of the first component, the second component and the fifth component, and a combination of the first component, the second component, the third component and the fourth component, a combination of the first component, the second component, the third component and the fifth component, a combination of the first component, the second component, the fourth component and the fifth component, and a combination of the first component, the second component, the third component and the fourth component and the fifth component. A preferred combination of the components in the composition includes the combination of the first component, the second component, the third component and the fourth component, and the combination of the first component, the second component, the third component, the fourth component and the fifth component.

A preferred ratio of the first component is about 10% by weight or more for increasing maximum temperature and the dielectric anisotropy, and is about 50% by weight or less for decreasing the minimum temperature. A further preferred ratio is in the range of about 15% by weight to about 40% by weight. A particularly preferred ratio is in the range of about 20% by weight to about 30% by weight.

A preferred ratio of the second component is about 10% by weight or more for increasing the dielectric anisotropy, and is about 90% by weight or less for decreasing the minimum temperature. A further preferred ratio is in the range of about 10% by weight to about 60% by weight. A particularly preferred ratio is in the range of about 15% by weight to about 40% by weight.

A preferred ratio of the third component is about 5% by weight or more for decreasing the viscosity, and is about 80% or less for decreasing the minimum temperature. A further preferred ratio is in the range of about 20% by weight to about 65% by weight. A particularly preferred ratio is in the range of about 45% by weight to about 60% by weight.

A preferred ratio of the fourth component is about 5% by weight or more for increasing the dielectric anisotropy, and is about 40% by weight or less for decreasing the minimum temperature. A further preferred ratio is in the range of about 10% by weight to about 30% by weight. A particularly preferred ratio is in the range of about 15% by weight to about 25% by weight.

The fifth component is particularly preferred for increasing the dielectric anisotropy. A preferred ratio of the fifth component is in the range of about 5% by weight to about 40% by weight. A further preferred ratio is in the range of about 5% by weight to about 30% by weight. A particularly preferred ratio is in the range of about 10% by weight to about 20% by weight.

Fourth, the preferred embodiment of the component compounds will be explained. $R^1$, $R^2$, $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine. Preferred $R^1$ or $R^2$ is alkyl having 1 to 12 carbons for increasing the stability to ultraviolet light or heat, or the like. Preferred $R^3$ or $R^4$ is alkenyl having 2 to 12 carbons for decreasing the viscosity, and is alkyl having 1 to 12 carbons for increasing the stability to ultraviolet light and heat. $R^5$ and $R^6$ are independently alkyl having 1 to 12 carbons or alkoxy having 1 to 12 carbons. Preferred $R^5$ or $R^6$ is independently alkyl having 2 to 12 carbons for decreasing the viscosity. $R^7$ is alkyl having 1 to 12 carbons. Preferred $R^7$ is alkyl having 1 to 3 carbons for decreasing the viscosity. $R^8$ and $R^9$ are independently alkyl having 1 to 12 carbons, alkoxy having 1 to 12 carbons or alkenyl having 2 to 12 carbons. Preferred $R^8$ or $R^9$ is alkenyl having 2 to 12 carbons for decreasing the minimum temperature, and is alkyl having 1 to 12 carbons for decreasing the viscosity.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferable in the alkenyl such as 1-propenyl, 1-butenyl, 1-pentenyl, 1-hexenyl, 3-pentenyl and 3-hexenyl for decreasing the viscosity, for instance. Cis preferable in the alkenyl such as 2-butenyl, 2-pentenyl and 2-hexenyl. In the alkenyl, straight-chain alkenyl is preferable to branched-chain alkenyl.

Preferred examples of the alkenyl in which arbitrary hydrogen is replaced by fluorine include 2,2-difluorovinyl, 3,3-difluoro-2-propenyl, 4,4-difluoro-3-butenyl, 5,5-difluoro-4-pentenyl and 6,6-difluoro-5-hexenyl. Further preferred examples include 2,2-difluorovinyl and 4,4-difluoro-3-butenyl for decreasing the viscosity.

Alkyl doesn't include circular alkyl. Alkoxy doesn't include circular alkoxy. Alkenyl doesn't include circular alkenyl.

Ring A and ring B are independently 1,4-cyclohexylene, 1,4-phenylene, 2-fluoro-1,4-phenylene, 3-fluoro-1,4-phenylene. Two of arbitrary ring A may be identical or different when p is 2 or 3. Preferred ring A or ring B is 1,4-cyclohexylene for decreasing the viscosity, and is 1,4-phenylene for increasing the optical anisotropy. Ring C is independently 1,4-cyclohexylene, 1,4-phenylene, 3-fluoro-1,4-phenylene, 3,5-difluoro-1,4-phenylen,2,5-pyrimidine 1,3-dioxane-2,5-diyl, or tetrahydropyrane-2,5-dyil. Two of arbitrary ring C may be identical or different when q is 2 or 3. Preferred ring C is 1,4-cyclohexylene for increasing the maximum temperature, and is 1,4-phenylene for increasing the optical anisotropy.

$X^1, X^2, X^3, X^4, X^5, X^6$ and $X^7$ are independently hydrogen or fluorine. Preferred $X^1$, $X^2$, $X^3$, $X^6$ or $X^7$ is fluorine for increasing the dielectric anisotropy. Preferred $X^4$ or $X^5$ is oxygen for increasing the maximum temperature, or for decreasing the viscosity.

$Y^1$ is fluorine or chlorine. Preferred $Y^1$ is fluorine for decreasing the viscosity. $Y^2$ and $Y^3$ are independently fluorine, chlorine or trifluoromethoxy. Preferred $Y^2$ or $Y^3$ is fluorine for decreasing the viscosity, and is chlorine or trifluoromethoxy for decreasing the minimum temperature.

$Z^1$ is a single bond, ethylene or carbonyloxy. Two of arbitrary rings $Z^1$ may be identical or different when p is 2 or 3. Preferred $Z^1$ is a single bond for decreasing the viscosity and is difluoromethyleneoxy for increasing the dielectric anisotropy. $Z^2$ is a single bond, ethylene, carbonyloxy or difluoromethyleneoxy. Two of arbitrary rings $Z^2$ may be identical or different when q is 2. Three of $Z^2$ are all single bonds when q is 3. Preferred $Z^2$ is a single bonds for decreasing the viscosity, and is difluoromethyeleneoxy for increasing the dielectric anisotropy.

P is 1, 2 or 3. Preferred p is 1 for decreasing the viscosity, and is 3 for increasing the maximum temperature. q is 1, 2 or 3. Preferred q is 2 for increasing the maximum temperature, and is 3 for increasing the stability to ultraviolet light and heat.

Fifth, the specific examples of the component compounds will be shown. In the preferred compounds described below, $R^{10}$ and $R^{12}$ are independently alkyl having 1 to 12 carbons or alkenyl having 2 to 12 carbons. $R^{11}$ is alkyl having 1 to 7, and the same rule applies to $R^4$ and $R^6$. With regard to a configuration of 1,4-cyclohexylene in the compounds, trans is preferable to cis for increasing the maximum temperature.

Preferred compound (1) is compound (1-1-1). Preferred compound (2) is (2-1-1). Preferred compound (3) are compound (3-1-1) to (3-16-1). Further preferred compound (3) are compound (3-1-1) to (3-7-1), and compound (3-10-1) to (3-16-1). Particularly preferred compound (3) are compound (3-2-1) to (3-4-1), (3-6-1), (3-10-1), (3-11-1), (3-11-1) and (3-16-1). Preferred compound (4) are compound (4-1-1) to compound (4-21-1). Further preferred compound (4) are compound (4-5-1) to (4-8-1), and (4-13-1) to (4-21-1). Particularly preferred compound (4) are compound (4-14-1) to compound (4-17-1), compound (4-20-1), (4-21-1). Preferred compound (5) is compound (5-1).

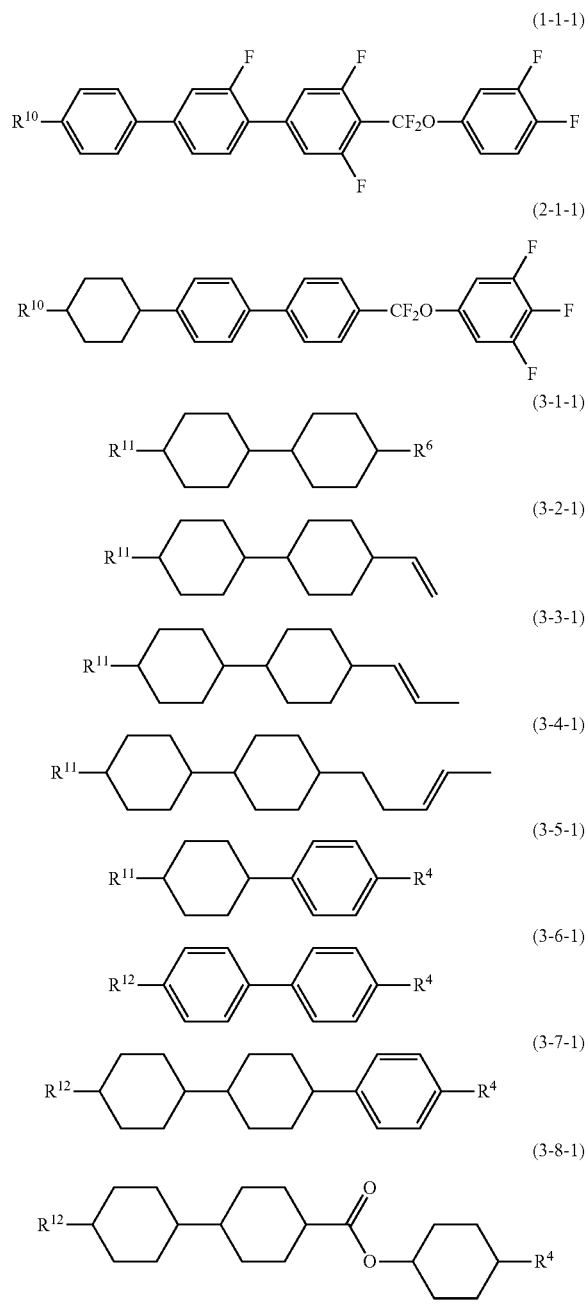

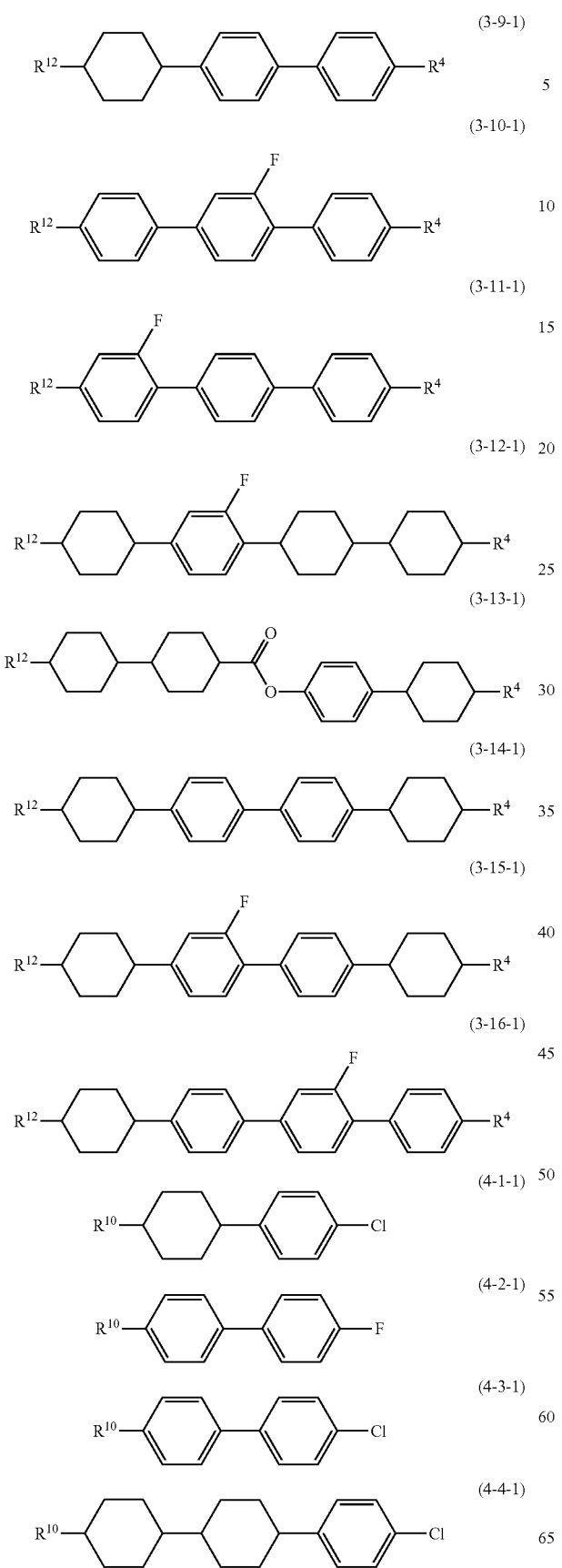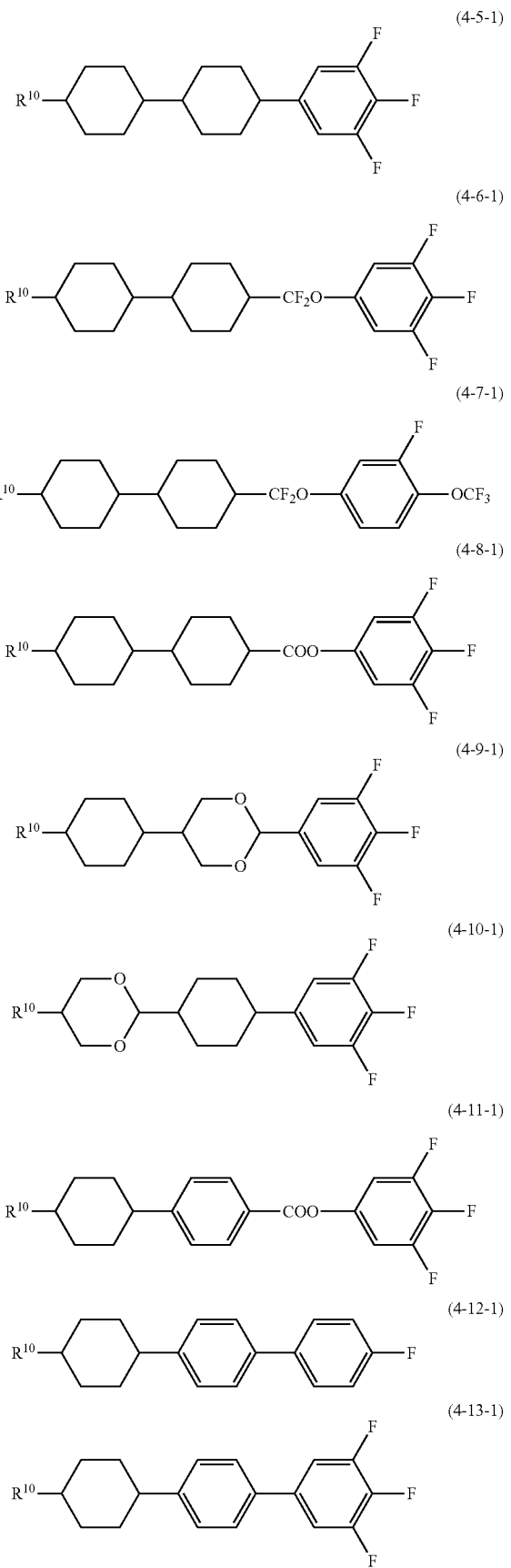

(4-14-1)
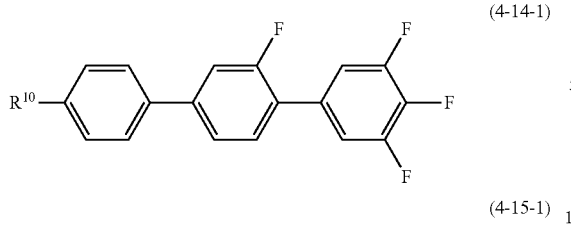

(4-15-1)

(4-16-1)

(4-17-1)
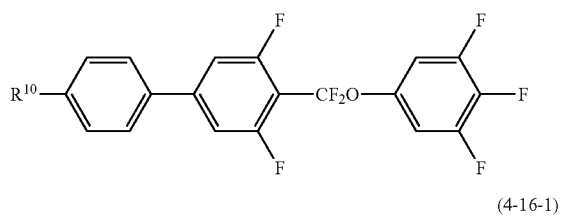

(4-18-1)

(4-19-1)
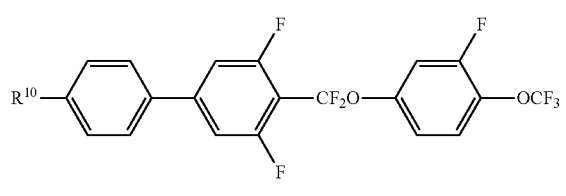

(4-20-1)

(4-21-1)
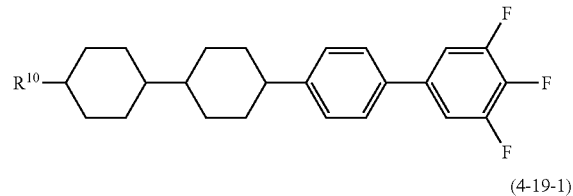... no (4-14-1)

(4-15-1)

(4-16-1)

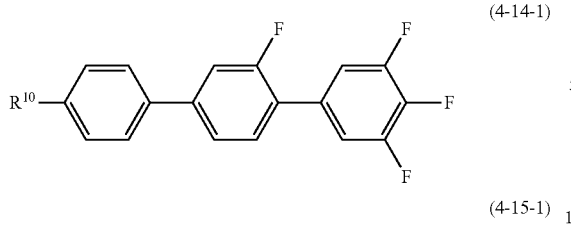
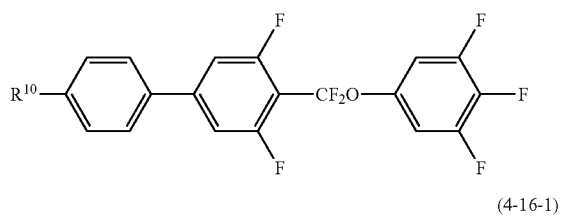
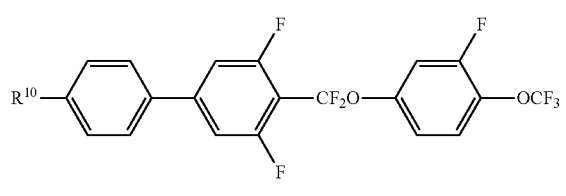

(4-17-1)

(4-18-1)

(4-19-1)

(4-20-1)

(4-21-1)

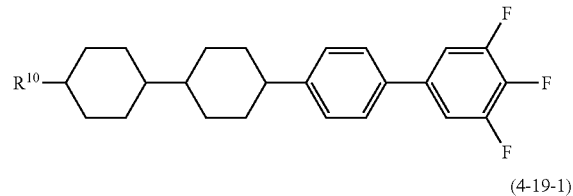
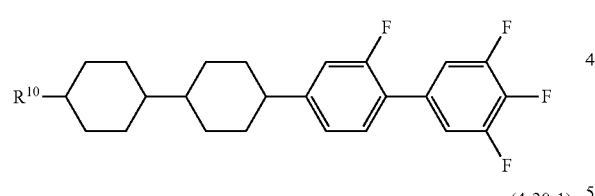
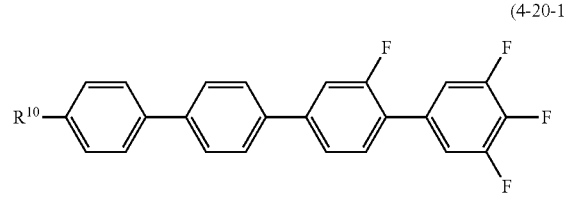
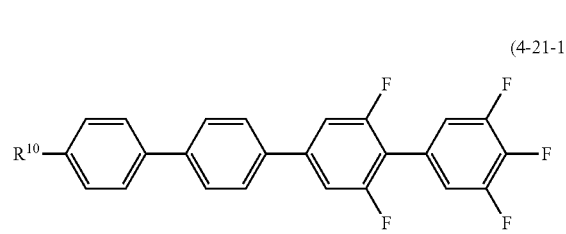

(5-1)

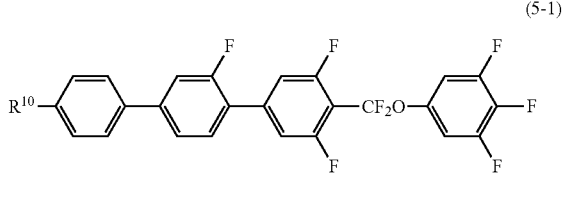

Sixth, the additive that may be mixed with the composition will be explained. Such an additive includes the optically active compound, the first component, the antioxidant, the ultraviolet light absorber, the dye, the antifoaming agent, the polymerizable compound and the polymerization initiator. The optically active compound is mixed with the composition for the purpose of inducing a helical structure and giving a twist angle in liquid crystals. Examples of such compounds include the compound (6-1) to the compound (6-4). A preferred ratio of the optically active compound is about 5% by weight or less. A further preferred ratio is in the range of about 0.01% by weight to about 2% by weight.

(6-1)

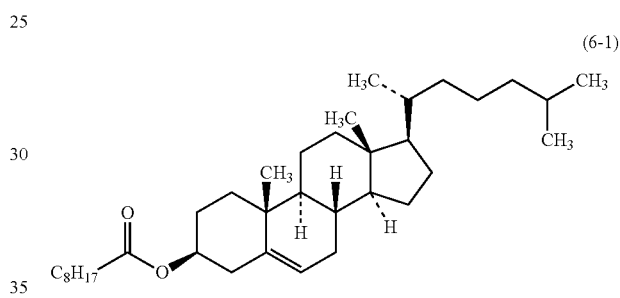

(6-2)

(6-3)

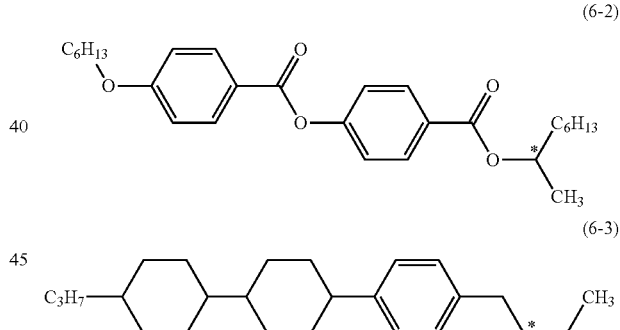

(6-4)

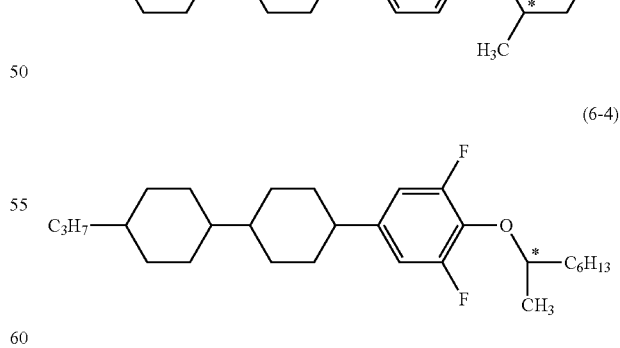

The antioxidant is mixed with the composition for the purpose of preventing a decrease in the specific resistance caused by heating in air, or maintaining a large voltage holding ratio at room temperature and also at a temperature close to the maximum temperature of the nematic phase after the device was used for a long period of time.

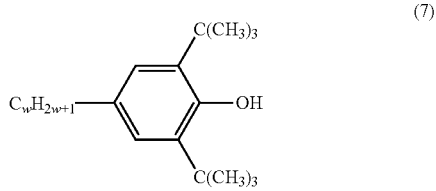

Preferred examples of the antioxidant include compound (7) where w is an integer from 1 to 9. In compound (7), preferred w is 1, 3, 5, 7 or 9. Further preferred w is 1 or 7. Compound (7) where w is 1 is effective in preventing a decrease in the specific resistance caused by heating in air because the compound (7) has a large volatility. Compound (7) where w is 7 is effective in maintaining a large voltage holding ratio at room temperature and also at a temperature close to the maximum temperature of the nematic phase after the device was used for a long period of time because the compound (7) has a small volatility. A preferred ratio of the antioxidant is about 50 ppm or more for obtaining the effect thereof, and is about 600 ppm or less for avoiding a decrease in the maximum temperature or avoiding an increase in the minimum temperature. A further preferred ratio is in the range of about 100 ppm to about 300 ppm.

Preferred examples of the ultraviolet light absorber include a benzophenone derivative, a benzoate derivative and a triazole derivative. A light stabilizer such as an amine having steric hindrance is also preferred. A preferred ratio of the ultraviolet light absorber or the stabilizer is about 50 ppm or more for achieving the effect thereof, and about 10,000 ppm or less for avoiding a decrease in the maximum temperature or avoiding an increase in the minimum temperature. A further preferred ratio is in the range of about 100 ppm to about 10,000 ppm.

A dichroic dye such as an azo dye or an anthraquinone dye is mixed with the composition to be adapted for a device having a guest host (GH) mode. A preferred ratio of the dye is in the range of about 0.01% by weight to about 10% by weight. The antifoaming agent such as dimethyl silicone oil or methyl phenyl silicone oil is mixed with the composition for preventing foam formation. A preferred ratio of the antifoaming agent is about 1 ppm or more for achieving the effect thereof, and about 1,000 ppm or less for avoiding a poor display. A further preferred ratio is in the range of about 1 ppm to about 500 ppm.

The polymerizable compound is mixed with the composition to be adapted for the device having the polymer sustained alignment (PSA) mode. Preferred examples of the polymerizable compound include a compound having a polymerizable group, such as an acrylate, a methacrylate, a vinyl compound, a vinyloxy compound, a propenyl ether, an epoxy compound (oxirane, oxetane) and a vinyl ketone. Particularly preferred examples include an acrylate derivative or a methacrylate derivative. A preferred ratio of the polymerizable compound is about 0.05% by weight or more for achieving the effect thereof, and about 10% by weight or less for avoiding a poor display. A further preferred ratio is in the range of about 0.1% by weight to about 2% by weight. The polymerizable compound is preferably polymerized by irradiation with ultraviolet light or the like in the presence of a suitable initiator such as a photopolymerization initiator. Suitable conditions for polymerization, suitable types of the initiator and suitable amounts thereof are known to a person skilled in the art and are described in literatures. For example, Irgacure 651 (registered trademark), Irgacure 184 (registered trademark) or Darocure 1173 (registered trademark) (Ciba Japan K.K.), each being a photoinitiator, is suitable for radical polymerization. A preferred ratio of the photopolymerization initiator is in the range of about 0.1% by weight to about 5% by weight of the polymerizable compound, and a particularly preferred ratio is in the range of about 1% by weight to about 3% by weight thereof.

Seventh, the methods for synthesizing the component compounds will be explained. The compounds can be prepared according to known methods. Examples of the synthesizing methods are shown. Compound (1-1-1) and compound (2-1-1) are prepared by the method described in JP H10-251186 A (1998). Compound (3-1-1) is prepared by the method described in JP S59-70624 A (1984). Compound (3-2-1) is prepared by the method described in JP S59-176221 A (1984). Compound (4-5-1) is prepared by the method described in JP H2-233626 A (1990). Compound (5-1) is prepared by the method described in JP 10-251186 A (1998). The antioxidant is commercially available. A compound represented by formula (7) where w is 1 is available from Sigma-Aldrich Corporation. Compound (7) where w is 7 and so forth are prepared according to the method described in U.S. Pat. No. 3,660,505 B.

Any compounds whose synthesizing methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press), and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be explained. The composition of the invention mainly has a minimum temperature of about −10° C. or lower, a maximum temperature of about 70° C. or higher, and an optical anisotropy in the range of about 0.07 to about 0.20. The device containing the composition has a large voltage holding ratio. The composition is suitable for use in the AM device. The composition is particularly suitable for use in a transmissive AM device. The composition having an optical anisotropy in the range of about 0.08 to about 0.25, and also the composition having an optical anisotropy in the range of about 0.10 to about 0.30 may be prepared by adjusting the ratio of the component compounds or by mixing with any other liquid crystal compound. The composition can be used as the composition having the nematic phase and as the optically active composition by adding the optically active compound.

The composition can be used in the AM device, and also in a PM device. The composition can be used in an AM device and a PM device each having a mode such as PC, TN, STN, ECB, OCB, IPS, VA, FFS or PSA. Use in the AM device having the TN, OCB, IPS or FFS mode is particularly preferred. The arrangement of the liquid crystal molecule may be parallel or vertical to the panel substitute when the voltage is not applied. The devices may be of a reflective type, a transmissive type or a transflective type. Use in the transmissive device is preferred. The composition can also be used in an amorphous silicon-TFT device or a polycrystal silicon-TFT device. The composition can also be used in a nematic curvilinear aligned phase (NCAP) device prepared by microencapsulating the composition, and in a polymer dispersed (PD) device in which a three-dimensional network-polymer is formed in the composition.

EXAMPLES

In order to evaluate characteristics of a composition and a compound to be contained in the composition, the composition and the compound were made a measurement object. When the measurement object was the composition, the composition was measured as a sample as is, and values obtained were described. When the measurement object was the compound, a sample for measurement was prepared by mixing the compound (15% by weight) with mother liquid crystals (85% by weight). Values of characteristics of the compound were calculated according to an extrapolation method using values obtained by measurement: (extrapolated value)={(measured value of a sample)−0.85×(measured value of mother liquid crystals)}/0.15. When a smectic phase (or crystals) precipitated at the ratio thereof at 25° C., a ratio of the compound to the mother liquid crystals was changed in the order of (10% by weight:90% by weight), (5% by weight:95% by weight) and (1% by weight:99% by weight). Values of a maximum temperature, an optical anisotropy, viscosity and a dielectric anisotropy with regard to the compound were determined by the extrapolation method.

Components of the mother liquid crystals were as described below. A ratio of each component was expressed in terms of weight percent.

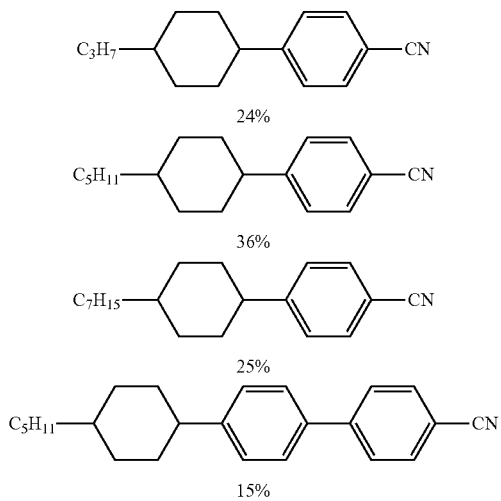

Values of physical properties were determined by measurement according to the methods described below. Most of the methods are applied as described in EIAJ ED-2521A of the Standard of Electronic Industries Association of Japan, or modified thereon.

Maximum Temperature of a Nematic Phase (NI; ° C.): A sample was placed on a hot plate in a melting point apparatus equipped with a polarizing microscope and was heated at a rate of 1° C. per minute. Temperature when a part of the sample began to change from a nematic phase to an isotropic liquid was measured. A higher limit of a temperature range of the nematic phase may be abbreviated as "maximum temperature."

Minimum Temperature of a Nematic Phase ($T_c$; ° C.): A sample having a nematic phase was put in glass vials, and the vials were kept in freezers at temperatures of 0° C., −10° C., −20° C., −30° C. and −40° C. for 10 days, and then liquid crystal phases were observed. For example, when the sample maintained the nematic phase at −20° C. and changed to crystals or a smectic phase at −30° C., $T_c$ was expressed as $T_c \leq -20°$ C. A lower limit of a temperature range of the nematic phase may be abbreviated as "minimum temperature."

Viscosity (bulk viscosity; η; measured at 20° C.; mPa·s): A cone-plate (E type) viscometer was used for measurement.

Viscosity (rotational viscosity; γ1; measured at 25° C.; mPa·s): Measurement was carried out according to the method described in M. Imai et al., Molecular Crystals and Liquid Crystals, Vol. 259, p. 37 (1995). A sample was put in a TN device in which a twist angle was 0 degrees and a distance (cell gap) between two glass substrates was 5 micrometers. A voltage was stepwise applied to the device in the range of 16 V to 19.5 V at an increment of 0.5 V. After a period of 0.2 second with no application, a voltage was repeatedly applied under the conditions of only one of rectangular waves (rectangular pulse; 0.2 second) and no application (2 seconds). A peak current and peak time of a transient current generated by the application were measured. A value of rotational viscosity was obtained from the measured values and calculation equation (8) described on page 40 of the paper presented by M. Imai et al. A value of dielectric anisotropy necessary for the calculation was determined according to the method described below by using the device in which the rotational viscosity was measured.

Optical Anisotropy (refractive index anisotropy; Δn; measured at 25° C.): Measurement was carried out by means of an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−n⊥.

Dielectric Anisotropy (Δ∈; measured at 25° C.): A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (∈∥) in the major axis direction of liquid crystal molecules was measured. Sine waves (0.5 V, 1 kHz) were applied to the device, and after 2 seconds, a dielectric constant (∈⊥) in the minor axis direction of the liquid crystal molecules was measured. A value of optical anisotropy was calculated from an equation: Δ∈=∈∥−∈⊥.

Threshold Voltage (Vth; measured at 25° C.; V): An LCD-5100 luminance meter made by Otsuka Electronics Co., Ltd. was used for measurement. A light source was a halogen lamp. A sample was put in a normally white mode TN device in which a distance (cell gap) between two glass substrates was about 0.45/Δn (μm) and a twist angle was 80 degrees. A voltage (32 Hz, rectangular waves) to be applied to the device was stepwise increased from 0 V to 10 V at an increment of 0.02 V. On the occasion, the device was irradiated with light from a direction perpendicular to the device, and the amount of light passing through the device was measured. A voltage-transmittance curve was prepared, in which the maximum amount of light corresponds to 100% transmittance and the minimum amount of light corresponds to 0% transmittance. A threshold voltage is a voltage at 90% transmittance.

Voltage Holding Ratio (VHR-1; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-2; measured at 80° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B is an area without decay. A voltage holding ratio is a percentage of area A to area B.

Voltage Holding Ratio (VHR-3; measured at 25° C.; %): Stability to ultraviolet light was evaluated by measuring a voltage holding ratio after irradiation with ultraviolet light. A composition having a large VHR-3 has a high stability to ultraviolet light. A TN device used for measurement had a polyimide alignment film and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In measuring VHR-3, a decaying voltage was measured for 16.7 milliseconds. A composition having a large VHR-3 has a high stability to ultraviolet light. A value of VHR-3 is preferably in the range of 90% or more, further preferably, 95% or more.

Voltage Holding Ratio (VHR-4; measured at 25° C.; %): Stability to heat was evaluated by measuring a voltage holding ratio after a TN device into which a sample was injected was heated in a constant-temperature bath at 80° C. for 500 hours. In measuring VHR-4, a decaying voltage was measured for 16.7 milliseconds. A composition having a large VHR-4 has a high stability to heat.

Response Time ($\tau$; measured at 25° C.; ms): An LCD-5100 luminance meter made by Otsuka Electronics Co., Ltd. was used for measurement. A light source was a halogen lamp. A low-pass filter was set at 5 kHz. A sample was put in a normally white mode TN device in which a distance (cell gap) between two glass substrates was 5.0 micrometers and a twist angle was 80 degrees. Rectangular waves (60 Hz, 5 V, 0.5 second) were applied to the device. On the occasion, the device was irradiated with light from a direction perpendicular to the device, and the amount of light passing through the device was measured. The maximum amount of light corresponds to 100% transmittance, and the minimum amount of light corresponds to 0% transmittance. Rise time ($\tau r$; millisecond) is a period of time required for a change from 90% transmittance to 10% transmittance. Fall time ($\tau f$; millisecond) is a period of time required for a change from 10% transmittance to 90% transmittance. Response time is a sum of the rise time and the fall time thus determined.

Elastic Constant (K; measured at 25° C.; pN): HP4284A LCR meter made by Yokogawa-Hewlett-Packard Co. was used for measurement. A sample was put in a homogeneous alignment cell in which a distance (cell gap) between two glass substrates was 20 micrometers. An electric charge from 0 V to 20 V was applied to the cell, and an electrostatic capacity and an applied voltage were measured. Measured values of electrostatic capacity (C) and applied voltage (V) were fitted to equation (2.98) and equation (2.101), and thus values of K11 and K33 were obtained from equation (2.99), the equations being described on page 75 of "Liquid Crystal Device Handbook" (Ekisho Debaisu Handobukku in Japanese) (The Nikkan Kogyo Shimbun, Ltd.). Next, K22 was calculated by fitting the values of K11 and K33 determined previously to equation (3.18) on page 171 of the same Handbook. An elastic constant is a mean of K11, K22 and K33 thus determined.

Specific Resistance ($\rho$; measured at 25° C.; $\Omega$cm): Into a vessel equipped with an electrode, 1.0 milliliter of a sample was injected. A DC voltage (10 V) was applied to the vessel, and a DC current after 10 seconds was measured. A specific resistance was calculated from the following equation: (specific resistance)={(voltage)×(electric capacity of vessel)}/{(DC current)×(dielectric constant of vacuum)}.

Gas Chromatographic Analysis: GC-14B gas chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 µm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample injector. A recorder was C-R5A Chromatopac made by Shimadzu Corporation or the equivalent thereof. The resulting gas chromatogram showed retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 µm) made by Agilent Technologies, Inc., Rtx-1 (length 30 m, bore 0.32 mm, film thickness 0.25 µm) made by Restek Corporation and BP-1 (length 30 m, bore 0.32 mm, film thickness 0.25 µm) made by SGE International Pty. Ltd. A capillary column CBP1-M50-025 (length 50 m, bore 0.25 mm, film thickness 0.25 µm) made by Shimadzu Corporation may also be used for the purpose of avoiding an overlap of peaks of the compounds.

A ratio of liquid crystal compounds contained in a composition may be calculated according to the method as described below. The liquid crystal compounds can be detected by means of a gas chromatograph. A ratio of peak areas in a gas chromatogram corresponds to a ratio (in the number of moles) of the liquid crystal compounds. When the capillary columns described above were used, a correction coefficient of each of the liquid crystal compounds may be regarded as 1 (one). Accordingly, a ratio (% by weight) of the liquid crystal compounds was calculated from the ratio of the peak areas.

The invention will be explained in detail by way of Examples. The invention is not limited by the Examples described below. The compounds described in Comparative Examples and Examples were expressed using symbols according to definitions in Table 3 below. In Table 3, a configuration of 1,4-cyclohexylene is trans. A parenthesized number next to a symbolized compound in Examples corresponds to the number of the preferred compound. A symbol (–) means any other liquid crystal compound. A ratio (percentage) of liquid crystal compounds is expressed in terms of weight percent (% by weight) based on the total weight of the liquid crystal composition. The liquid crystal composition further contains an impurity. Last, values of characteristic of the liquid crystal composition and the liquid crystal display device containing the composition were summarized.

TABLE 3

Method for Description of Compounds using Symbols
R—(A₁)—Z₁—...—Zₙ—(Aₙ)—R'

| 1) Left-terminal Group R— | Symbol |
|---|---|
| $C_nH_{2n+1}$— | n— |
| $C_nH_{2n+1}O$— | nO— |
| $C_mH_{2m+1}OC_nH_{2n}$— | mOn— |
| $CH_2=CH$— | V— |
| $C_nH_{2n+1}$—CH=CH— | nV— |
| $CH_2=CH$—$C_nH_{2n}$— | Vn— |
| $C_mH_{2m+1}$—CH=CH—$C_nH_{2n}$— | mVn— |
| $CF_2=CH$— | VFF— |
| $CF_2=CH$—$C_nH_{2n}$— | VFFn— |

| 2) Right-terminal Group —R' | Symbol |
|---|---|
| —$C_nH_{2n+1}$ | —n |
| —$OC_nH_{2n+1}$ | —On |
| —CH=$CH_2$ | —V |
| —CH=CH—$C_nH_{2n+1}$ | —Vn |
| —$C_nH_{2n}$—CH=$CH_2$ | —nV |
| —CH=$CF_2$ | —VFF |
| —F | —F |
| —Cl | —CL |
| —$OCF_3$ | —OCF3 |
| —CN | —C |
| —COO—$CH_3$— | —EMe |

| 3) Bonding Group —$Z_n$— | Symbol |
|---|---|
| —$C_2H_4$— | 2 |
| —COO— | E |
| —CHCH— | V |
| —C≡C— | T |
| —$CF_2O$— | X |

| 4) Ring Structure —$A_n$— | Symbol |
|---|---|
| 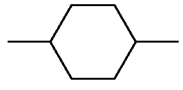 | H |
| 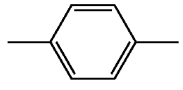 | B |
| 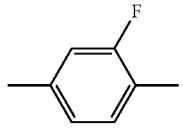 | B(F) |
| 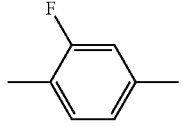 | B(2F) |
| 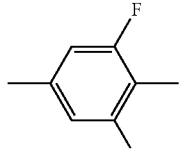 | B(F,F) |
| 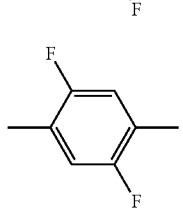 | B(2F,5F) |
| 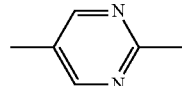 | Py |
| 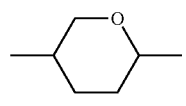 | dh |
| 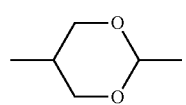 | G |

5) Example of Description

Example 1. 5-BB(F)B(F,F)XB(F)-F

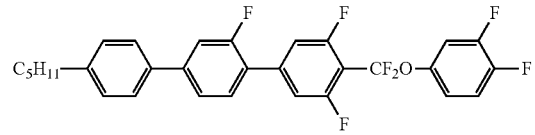

Example 2. 3-HBBXB(F,F)-F

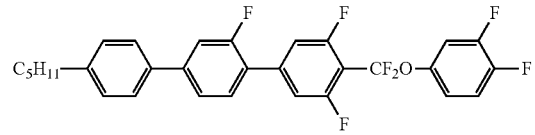

Example 3. 3-HBB-1

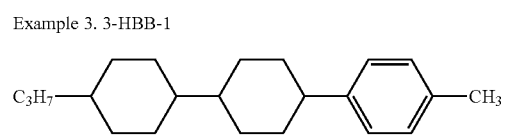

Example 4. 3-BB(F)B(F,F)-F

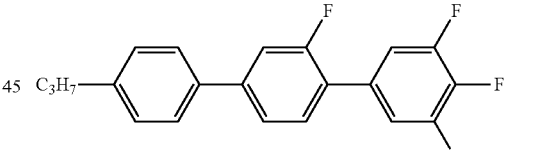

Comparative Example 1

Example 11 was selected from the compositions disclosed in JP 2009-84560 A. The basis of selection is that the composition contains compound (1), compound (3) and compound (4), and has the largest dielectric anisotropy. Components and characteristics of the composition were as described below.

| | | |
|---|---|---|
| 3-BB(F)B(F,F)XB(F)-F | (1-1-1) | 4% |
| 3-HH-V | (3-2-1) | 30% |
| 7-HB-1 | (3-5-1) | 3% |
| 3-HB-O2 | (3-5-1) | 3% |
| V2-BB-2V | (3-6-1) | 5% |
| 3-HBB-2 | (3-9-1) | 7% |

-continued

| | | |
|---|---|---|
| 2-BB(F)B-3 | (3-10-1) | 5% |
| 1-BB(F)B-2V | (3-10-1) | 5% |
| 3-HHEBH-3 | (3-13-1) | 3% |
| 3-HH-VFF | (3) | 15% |
| 1V2-BB-F | (4-2-1) | 3% |
| 1V2-BB-CL | (4-3-1) | 3% |
| 3-HHXB(F)-OCF3 | (4-7-1) | 3% |
| 3-HHBB(F,F)-F | (4-18-1) | 3% |
| 4-BB(F)B(F,F)XB-OCF3 | (—) | 4% |
| 3-BB(F,F)B(F,F)XB(F)-OCF3 | (—) | 4% |

NI=70.4° C.; Tc≤−20° C.; Δn=0.116; Δ∈=3.9; Vth=2.36 V; η=15.1 mPa·s; γ1=48.4 mPa·s; τ=5.0 ms; VHR-1=99.3%; VHR-2=98.1%; VHR-3=98.0%.

Comparative Example 2

Example 8 was selected from the compositions disclosed in WO 2008-102641 A. The basis of selection is that the composition contains compound (1) and compound (3), and has the largest dielectric anisotropy. Components and characteristics of the composition were as described below.

| | | |
|---|---|---|
| 3-BBB(F,F)XB-CL | (1) | 3% |
| 3-HH-V | (3-2-1) | 47% |
| 3-HH-V1 | (3-3-1) | 8% |
| V2-BB-1 | (3-6-1) | 6% |
| V-HHB-1 | (3-7-1) | 3% |
| V2-BB(F)B-1 | (3-10-1) | 7% |
| V2-BB(F)B-3 | (3-10-1) | 4% |
| 5-HBBH-3 | (3-14-1) | 3% |
| 3-BB(F,F)B(F,F)XB(F,F)-F | (—) | 3% |
| 3-BBB(F,F)XB(F,F)-F | (—) | 3% |
| 1O1-HBBH-5 | (—) | 3% |
| 5-PyB(F)XB(F,F)-F | (—) | 5% |
| 5-PyB(F,F)XB(F,F)-F | (—) | 5% |

NI=78.3° C.; Tc≤−20° C.; Δn=0.112; Δ∈=3.1; Vth=2.35 V; γ1=42.9 mPa·s; τ=6.2 ms; VHR-1=99.0%; VHR-2=98.1%; VHR-3=98.2%.

Example 1

| | | |
|---|---|---|
| 3-BB(F)B(F,F)XB(F)-F | (1-1-1) | 20% |
| 5-BB(F)B(F,F)XB(F)-F | (1-1-1) | 4% |
| 3-HBBXB(F)-F | (2-1-1) | 7% |
| 5-HBBXB(F)-F | (2-1-1) | 8% |
| 3-HH-V | (3-2-1) | 45% |
| 7-HB-1 | (3-5-1) | 3% |
| 3-HB-O1 | (3-5-1) | 4% |
| V2-BB(F)B-1 | (3-10-1) | 6% |
| V2-BB(F)B-3 | (3-10-1) | 3% |

NI=87.7° C.; Tc≤−20° C.; Δn=0.127; Δ∈=5.6; γ1=48.2 mPa·s; VHR-1=99.3%; VHR-2=98.5%; VHR-3=98.4%.

Example 2

| | | |
|---|---|---|
| 2-BB(F)B(F,F)XB(F)-F | (1-1-1) | 3% |
| 3-BB(F)B(F,F)XB(F)-F | (1-1-1) | 20% |
| 3-HBBXB(F)-F | (2-1-1) | 8% |
| 5-HBBXB(F)-F | (2-1-1) | 7% |
| 3-HH-5 | (3-1-1) | 4% |

| | | |
|---|---|---|
| 5-HH-O1 | (3-1-1) | 5% |
| 3-HH-V | (3-2-1) | 28% |
| 3-HH-V1 | (3-3-1) | 5% |
| 7-HB-1 | (3-5-1) | 6% |
| V2-BB-1 | (3-6-1) | 3% |
| 1V2-BB-1 | (3-6-1) | 3% |
| 3-HHB-1 | (3-7-1) | 4% |
| 1-BB(F)B-2V | (3-10-1) | 4% |

NI=87.4° C.; Tc≤−20° C.; Δn=0.125; Δ∈=5.8; γ1=48.1 mPa·s; VHR-1=99.4%; VHR-2=98.6%; VHR-3=98.3%.

Example 3

| | | |
|---|---|---|
| 3-BB(F)B(F,F)XB(F)-F | (1-1-1) | 7% |
| 5-BB(F)B(F,F)XB(F)-F | (1-1-1) | 6% |
| 3-HBBXB(F)-F | (2-1-1) | 10% |
| 3-HH-V | (3-2-1) | 30% |
| 3-HH-V1 | (3-3-1) | 5% |
| V2-BB-2V | (3-6-1) | 4% |
| 1V2-BB-2V1 | (3-6-1) | 3% |
| 4-HHEH-3 | (3-8-1) | 5% |
| 1V-HBB-2 | (3-9-1) | 5% |
| 3-B(F)BB-2 | (3-11-1) | 3% |
| 3-HB-CL | (4-1-1) | 3% |
| 1V2-BB-F | (4-2-1) | 3% |
| 1V2-BB-CL | (4-3-1) | 3% |
| 3-BB(F)B(F,F)-F | (4-14-1) | 8% |
| 2-HHBB(F,F)-F | (4-18-1) | 5% |

NI=85.2° C.; Tc≤−20° C.; Δn=0.132; Δ∈=5.6; γ1=46.9 mPa·s; VHR-1=99.3%; VHR-2=98.5%; VHR-3=98.1%.

Example 4

| | | |
|---|---|---|
| 2-BB(F)B(F,F)XB(F)-F | (1-1-1) | 5% |
| 3-BB(F)B(F,F)XB(F)-F | (1-1-1) | 9% |
| 5-HBBXB(F)-F | (2-1-1) | 10% |
| 2-HH-3 | (3-1-1) | 12% |
| 3-HH-O1 | (3-1-1) | 3% |
| 3-HH-V | (3-2-1) | 32% |
| V2-HHB-1 | (3-7-1) | 4% |
| 5-HHB-CL | (4-4-1) | 3% |
| V-HHB(F,F)-F | (4-5-1) | 3% |
| 3-HHXB(F,F)-F | (4-6-1) | 3% |
| 3-HHXB(F)-OCF3 | (4-7-1) | 3% |
| 5-HHEB(F,F)-F | (4-8-1) | 5% |
| 3-BB(F)B(F,F)-F | (4-14-1) | 5% |
| 3-HHB(F)B(F,F)-F | (4-19-1) | 3% |

NI=85.0° C.; Tc≤−20° C.; Δn=0.102; Δ∈=5.5; γ1=46.9 mPa·s; VHR-1=99.1%; VHR-2=98.5%; VHR-3=98.4%.

A pitch measured when 0.25 part of the optically active compound (6-3) (left-handed twist) was added to 100 parts of compositions described just above was 92.4 μm.

Example 5

| | | |
|---|---|---|
| 2-BB(F)B(F,F)XB(F)-F | (1-1-1) | 11% |
| 3-HBBXB(F)-F | (2-1-1) | 10% |
| 2-HH-3 | (3-1-1) | 11% |
| 3-HH-O1 | (3-1-1) | 3% |
| 3-HH-V | (3-2-1) | 29% |

| | | |
|---|---|---|
| 3-HH-2V1 | (3-4-1) | 4% |
| V-HHB-1 | (3-7-1) | 3% |
| 2-BB(F)B-3 | (3-10-1) | 3% |
| 3-HHEBH-3 | (3-13-1) | 3% |
| 3-HHB-CL | (4-4-1) | 3% |
| 5-HHB(F,F)-F | (4-5-1) | 3% |
| 3-HHXB(F,F)-F | (4-6-1) | 3% |
| 3-HHXB(F)-OCF3 | (4-7-1) | 3% |
| 3-GHB(F,F)-F | (4-10-1) | 3% |
| 5-HBEB(F,F)-F | (4-11-1) | 3% |
| 3-BB(F)B(F,F)-F | (4-14-1) | 5% |

NI=86.1° C.; Tc≤−20° C.; Δn=0.104; Δ∈=5.5; γ1=46.8 mPa·s; VHR-1=99.0%; VHR-2=98.3%; VHR-3=98.0%.

Example 6

| | | |
|---|---|---|
| 5-BB(F)B(F,F)XB(F)-F | (1-1-1) | 12% |
| 3-HBBXB(F,F)-F | (2-1-1) | 8% |
| 5-HBBXB(F,F)-F | (2-1-1) | 7% |
| 2-HH-3 | (3-1-1) | 11% |
| 3-HH-V | (3-2-1) | 35% |
| 4-HH-V1 | (3-3-1) | 3% |
| 3-HB(F)HH-5 | (3-12-1) | 3% |
| 5-HBBH-3 | (3-14-1) | 4% |
| 5-HGB(F,F)-F | (4-9-1) | 3% |
| 3-HBB-F | (4-12-1) | 4% |
| 1-BB(F,F)XB(F,F)-F | (4-15-1) | 5% |
| 3-BB(F,F)XB(F,F)-F | (4-15-1) | 5% |

NI=86.9° C.; Tc≤−20° C.; Δn=0.103; Δ∈=5.6; γ1=46.4 mPa·s; VHR-1=99.3%; VHR-2=98.5%; VHR-3=98.4%.

Example 7

| | | |
|---|---|---|
| 3-BB(F)B(F,F)XB(F)-F | (1-1-1) | 12% |
| 3-HBBXB(F,F)-F | (2-1-1) | 7% |
| 5-HBBXB(F,F)-F | (2-1-1) | 7% |
| 2-HH-3 | (3-1-1) | 10% |
| 3-HH-V | (3-2-1) | 27% |
| V2-BB-1 | (3-6-1) | 5% |
| 5-HB(F)BH-3 | (3-15-1) | 3% |
| 5-HBB(F)B-2 | (3-16-1) | 4% |
| 3-HH-VFF | (3) | 7% |
| 3-HHXB(F)-OCF3 | (4-7-1) | 5% |
| 3-HBB(F,F)-F | (4-13-1) | 3% |
| 2-BB(F,F)XB(F,F)-F | (4-15-1) | 3% |
| 3-BB(F,F)XB(F)-OCF3 | (4-16-1) | 4% |
| 3-PyBB-F | (—) | 3% |

NI=85.7° C.; Tc≤−20° C.; Δn=0.116; Δ∈=5.7; γ1=46.1 mPa·s; VHR-1=99.0%; VHR-2=98.1%; VHR-3=97.9%.

Example 8

| | | |
|---|---|---|
| 2-BB(F)B(F,F)XB(F)-F | (1-1-1) | 3% |
| 3-BB(F)B(F,F)XB(F)-F | (1-1-1) | 15% |
| 3-HBBXB(F,F)-F | (2-1-1) | 10% |
| 2-HH-3 | (3-1-1) | 9% |
| 3-HH-V | (3-2-1) | 37% |
| 3-HH-V1 | (3-3-1) | 3% |
| V2-HHB-1 | (3-7-1) | 3% |
| 1-HHXB(F,F)-F | (4-6-1) | 3% |
| 3-BB(F,F)XB(F)-OCF3 | (4-16-1) | 3% |
| 3-BB(F,F)XB(F)-F | (4-17-1) | 3% |
| 3-BBB(F)B(F,F)-F | (4-20-1) | 2% |
| 3-HHB(F)-F | (4) | 3% |
| 2-H2HB(F)-F | (4) | 3% |
| 1O1-HBBH-5 | (—) | 3% |

NI=85.2° C.; Tc≤−20° C.; Δn=0.108; Δ∈=5.5; γ1=46.4 mPa·s; VHR-1=99.4%; VHR-2=98.5%; VHR-3=98.6%.

Example 9

| | | |
|---|---|---|
| 3-BB(F)B(F,F)XB(F)-F | (1-1-1) | 12% |
| 4-HBBXB(F,F)-F | (2-1-1) | 5% |
| 5-HBBXB(F,F)-F | (2-1-1) | 5% |
| 2-HH-3 | (3-1-1) | 13% |
| 5-HH-O1 | (3-1-1) | 3% |
| 3-HH-V | (3-2-1) | 38% |
| 3-HHEBH-3 | (3-13-1) | 4% |
| 5-HBB(F)B-3 | (3-16-1) | 3% |
| 3-HH-VFF | (3) | 3% |
| 2-BB(F,F)XB(F,F)-F | (4-15-1) | 2% |
| 3-BBB(F,F)B(F,F)-F | (4-21-1) | 2% |
| 3-BB(F)B(F,F)XB(F,F)-F | (5-1) | 3% |
| 4-BB(F)B(F,F)XB(F,F)-F | (5-1) | 7% |

NI=86.2° C.; Tc≤−20° C.; Δn=0.106; Δ∈=5.8; γ1=46.0 mPa·s; VHR-1=99.4%; VHR-2=98.5%; VHR-3=98.6%.

Example 10

| | | |
|---|---|---|
| 3-BB(F)B(F,F)XB(F)-F | (1-1-1) | 11% |
| 2-HBBXB(F,F)-F | (2-1-1) | 3% |
| 3-HBBXB(F,F)-F | (2-1-1) | 7% |
| 2-HH-3 | (3-1-1) | 11% |
| 3-HH-V | (3-2-1) | 39% |
| 3-HH-2V1 | (3-4-1) | 3% |
| V2-B(F)BB-2 | (3-11-1) | 5% |
| 5-HBB(F)B-2 | (3-16-1) | 5% |
| 1-HHB(F,F)-F | (4-5-1) | 3% |
| 3-BB(F)B(F,F)XB(F,F)-F | (5-1) | 3% |
| 4-BB(F)B(F,F)XB(F,F)-F | (5-1) | 7% |
| 5-BB(F)B(F,F)XB(F,F)-F | (5-1) | 3% |

NI=86.8° C.; Tc≤−20° C.; Δn=0.118; Δ∈=5.8; γ1=46.0 mPa·s; VHR-1=99.3%; VHR-2=98.4%; VHR-3=98.5%.

The compositions of examples 1 to 10 have a higher maximum temperature, a larger dielectric anisotropy, and a smaller rotation viscosity than the composition of examples 1 and 2. Thus, the liquid crystal composition according to the invention has superior characteristics to the liquid crystal compositions described in patent documents 1 and 2.

Industrial Applicability

The invention provides a liquid crystal composition satisfying at least one of characteristics such as a high maximum temperature of a nematic phase, a low minimum temperature of the nematic phase, a small viscosity, a large optical anisotropy, a large positive dielectric anisotropy, a large specific resistance, a high stability to ultraviolet light and a high stability to heat, or provides a liquid crystal composition having a suitable balance regarding at least two of the characteristics. A liquid crystal display device containing such a liquid crystal composition is applied as an AM device having a short response time, a large voltage holding ratio, a large contrast ratio, a long service life and so forth, and thus can be suitably used for a liquid crystal projector, a liquid crystal television and so forth.

What is claimed is:

1. The liquid crystal composition contains at least one compound selected from the group of compounds represented by formula (1) as a first component, and at least one compound selected from the group of compounds represented by formula (2) as a second component:

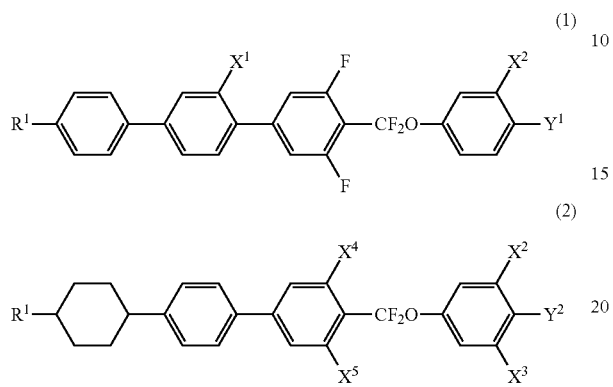

wherein $R^1$ and $R^2$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; $X^1$ is fluorine; $X^2$, $X^3$, $X^4$ and $X^5$ are independently hydrogen or fluorine; $Y^1$ is fluorine or chlorine; $Y^2$ is fluorine, chlorine or trifluoromethoxy.

2. The liquid crystal composition according to claim 1, wherein the first component is at least one compound selected from the group of compound represented by formula (1-1):

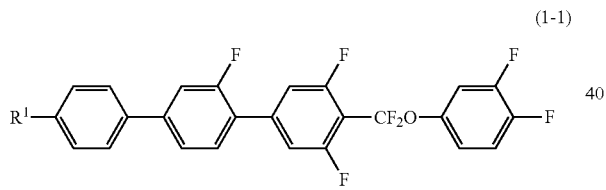

wherein $R^1$ is alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

3. The liquid crystal composition according to claim 1, wherein the second component is at least one compound selected from the group of compound represented by formula (2-1):

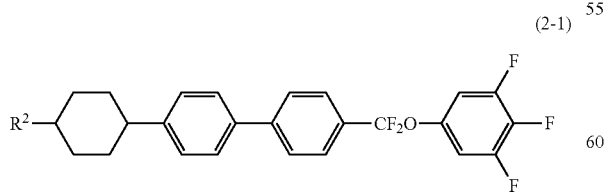

wherein $R^2$ is alkyl having 1 to 12 carbons, alkoxy having 1 to 12 carbons or alkenyl having 2 to 12 carbons, or alkenyl having 2 to 12 carbons in which arbitrary hydrogen is replaced by fluorine.

4. The liquid crystal composition according to claim 1, wherein a ratio of the first component is in the range of 10% by weight to 50% by weight and a ratio of the second component thereof is in the range of 10% by weight to 90% by weight based on the total weight of the liquid crystal composition.

5. The liquid crystal composition according to claim 1, wherein the liquid crystal composition further contains at least one compound selected from the group of compounds represented by formula (3) as a third component:

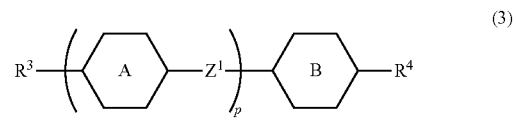

wherein $R^3$ and $R^4$ are independently alkyl having 1 to 12 carbons, alkoxy having 1 to 12 carbons, alkenyl having 2 to 12 carbons, or alkenyl having 2 to 12 carbons in which arbitrary hydrogen is replaced by fluorine; ring A and ring B are independently 1,4-cyclohexylene, 1,4-phenylene, 2-fluoro-1,4-phenylene, or 3-fluoro-1,4-phenylene; $Z^1$ is independently a single bond, ethylene or carbonyloxy; and p is 1, 2 or 3.

6. The liquid crystal composition according to claim 5, wherein the third component is at least one compound selected from the group of compounds represented by formula (3-1) to formula (3-16):

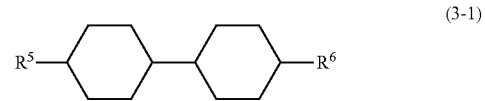

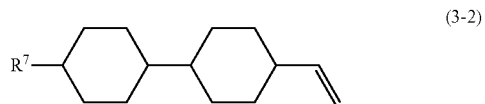

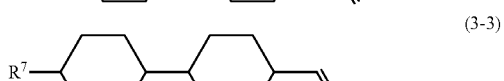

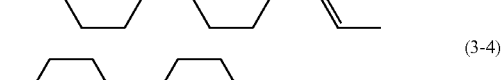

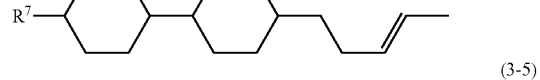

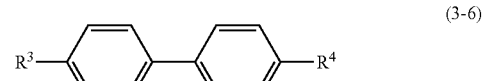

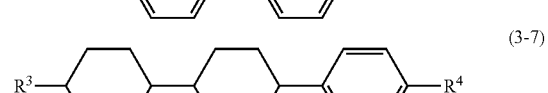

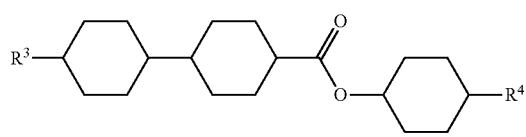

-continued

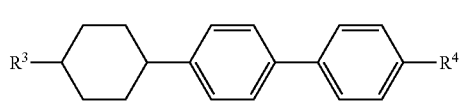
(3-9)

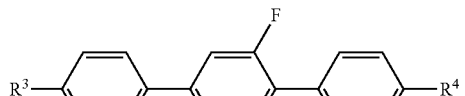
(3-10)

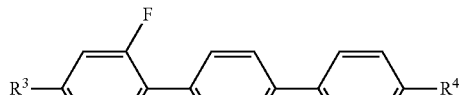
(3-11)

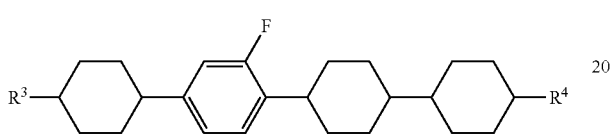
(3-12)

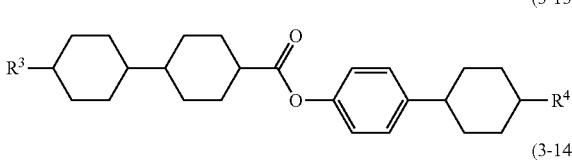
(3-13)

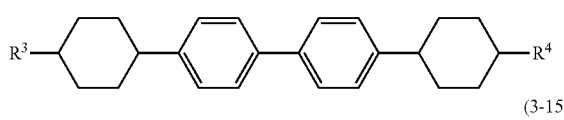
(3-14)

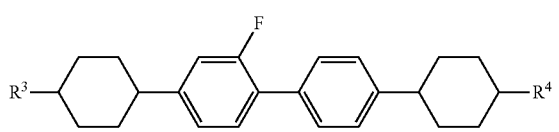
(3-15)

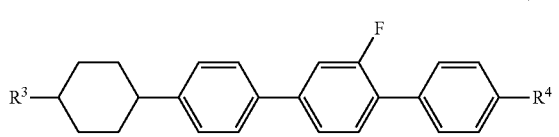
(3-16)

wherein $R^3$ and $R^4$ are independently alkyl having 1 to 12 carbons, alkoxy having 1 to 12 carbons or alkenyl having 2 to 12 carbons, or alkenyl having 2 to 12 carbons in which arbitrary hydrogen is replaced by fluorine; $R^5$ and $R^6$ are independently alkyl having 1 to 12 carbons or alkoxy having 1 to 12 carbons; $R^7$ is alkyl having 1 to 12 carbons.

7. The liquid crystal composition according to claim 6, wherein the third component is at least one compound selected from the group of compounds represented by formula (3-2).

8. The liquid crystal composition according to claim 6, wherein the third component is at least one compound selected from the group of compounds represented by formula (3-4).

9. The liquid crystal composition according to claim 6, wherein the third component is at least one compound selected from the group of compounds represented by formula (3-10).

10. The liquid crystal composition according to claim 6, wherein the third component is a mixture at least one compound selected from the group of compounds represented by formula (3-2) and at least one compound selected from the group of compounds represented by formula (3-10).

11. The liquid crystal composition according to claim 5, wherein a ratio of the third component is in the range of 5% by weight to 80% by weight based on the total weight of the liquid crystal composition.

12. The liquid crystal composition according to claim 1, wherein the liquid crystal composition further contains at least one compound selected from the group of compounds represented by formula (4) as a fourth component:

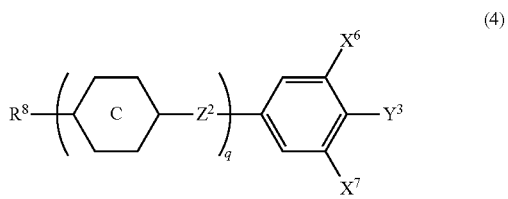
(4)

wherein $R^8$ is alkyl having 1 to 12 carbons, alkoxy having 1 to 12 carbons or alkenyl having 2 to 12 carbons; ring C is independently 1,4-cyclohexylene, 1,4-phenylene, 1,3-fluoro-1,4-phenylene, 3,5-difluoro-1,4-phenylene, 2,5-pyrimidine, 1,3-dioxane-2,5-diyl or tetrahydropyran-2,5-diyl; $X^6$ and $X^7$ are independently hydrogen or fluorine; and $Y^3$ is fluorine, chlorine or trifluoromethoxy; $Z^2$ is independently a single bond, ethylene, carbonyloxy or difluoromethyleneoxyl; q is 1, 2 or 3; and three $Z^2$ are all single bonds when q is 3.

13. The liquid crystal composition according to claim 12, wherein the fourth component is at least one compound selected from the group of compounds represented by formula (4-1) to formula (4-21):

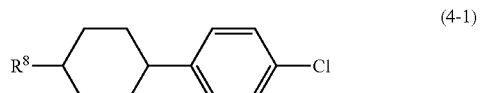
(4-1)

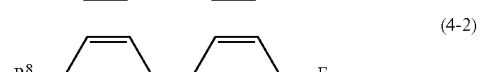
(4-2)

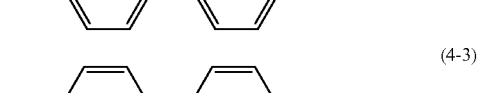
(4-3)

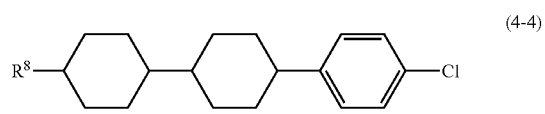
(4-4)

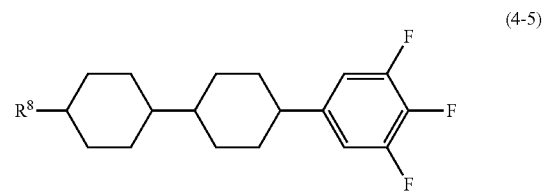
(4-5)

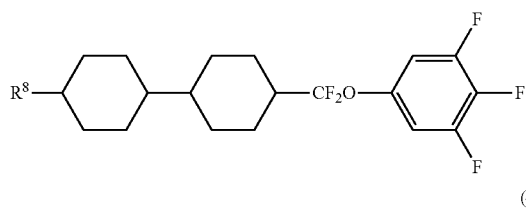 (4-6)

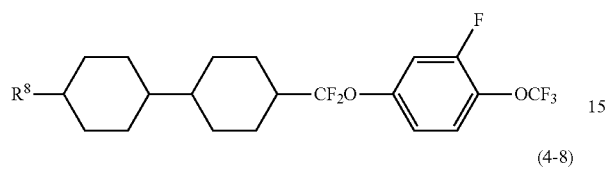 (4-7)

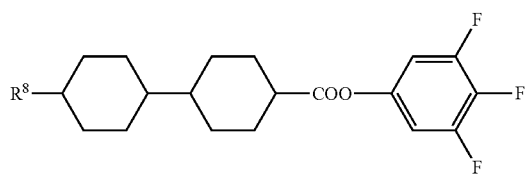 (4-8)

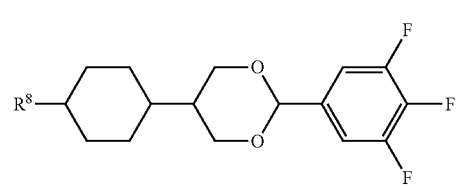 (4-9)

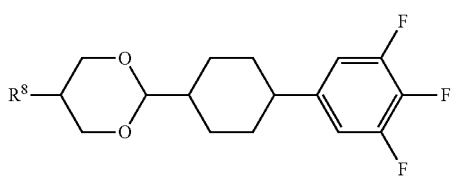 (4-10)

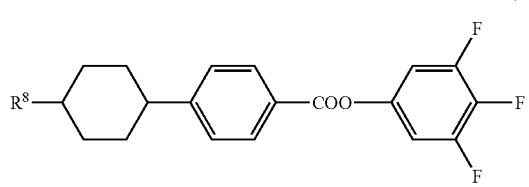 (4-11)

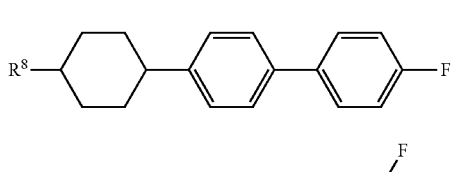 (4-12)

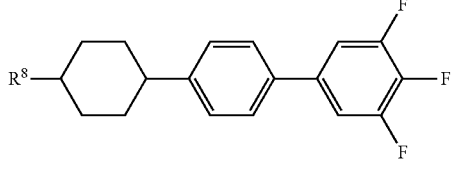 (4-13)

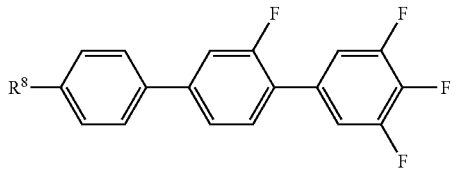 (4-14)

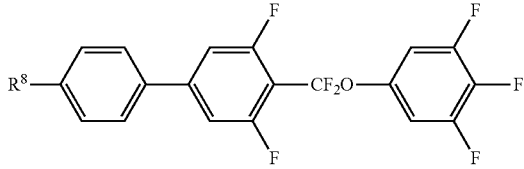 (4-15)

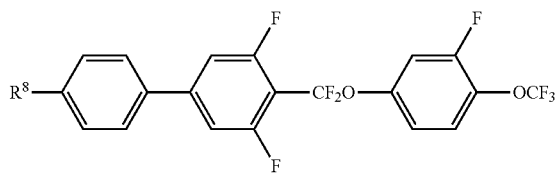 (4-16)

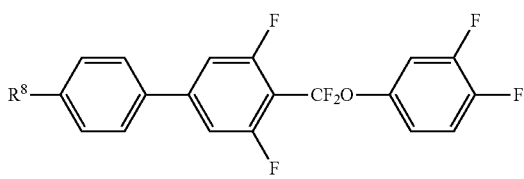 (4-17)

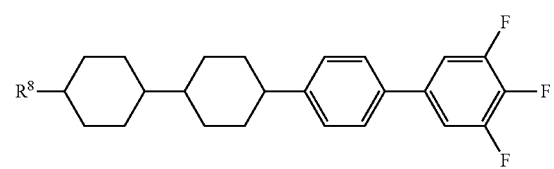 (4-18)

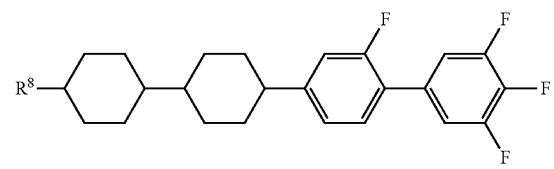 (4-19)

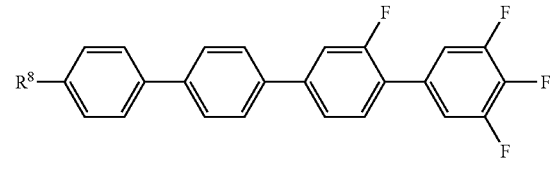 (4-20)

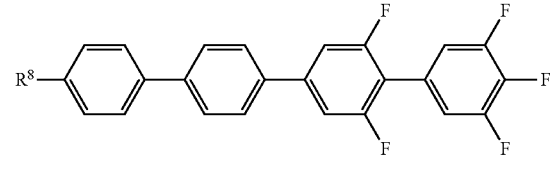 (4-21)

wherein $R^8$ is alkyl having 1 to 12 carbons, alkoxy having 1 to 12 carbons or alkenyl having 2 to 12 carbons.

14. The liquid crystal composition according to claim 12, wherein a ratio of the fourth component is in the range of 5% by weight to 40% by weight based on the total weight of the liquid crystal composition.

15. The liquid crystal composition according to claim 1, wherein the liquid crystal composition further contains at least one compound selected from the group of compounds represented by formula (5) as a fifth component:

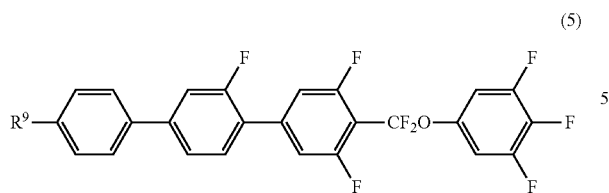 (5)

wherein $R^9$ is alkyl having 1 to 12 carbons, alkoxy having 1 to 12 carbons or alkenyl having 2 to 12 carbons.

16. The liquid crystal composition according to claim 15, wherein a ratio of the fifth component is in the range of 5% by weight to 40% by weight based on the total weight of the liquid crystal composition.

17. The liquid crystal composition according to claim 1, wherein a maximum temperature of a nematic phase is 70° C. or higher, an optical anisotropy (25° C.) at a wavelength of 589 nanometers is 0.08 or more, and a dielectric anisotropy (25° C.) at a frequency of 1 kHz is 2 or more.

18. The liquid crystal display device according to claim 1 including the liquid crystal composition.

19. The liquid crystal display device according to claim 18, wherein the operating mode of the liquid crystal display device is a TN mode, an OCB mode, an IPS mode, FFS mode or PSA mode, and the driving mode of the liquid crystal display device is an active matrix mode.

* * * * *